United States Patent Office 3,696,080
Patented Oct. 3, 1972

3,696,080
CYCLOBUTENE HOMOPOLYMERS AND COPOLYMERS
David M. Gale, Wilmington, Del., assignor to E. I. du Pont de Nemours and Company, Wilmington, Del.
No Drawing. Continuation-in-part of application Ser. No. 828,788, May 28, 1969, which is a continuation-in-part of application Ser. No. 599,730, Dec. 7, 1966. This application Sept. 8, 1970, Ser. No. 70,565
Int. Cl. C08f 5/00, 17/00
U.S. Cl. 260—78.5 N
31 Claims

ABSTRACT OF THE DISCLOSURE

Described herein are (1) copolymers formed by copolymerization of
(a) compounds of the formula

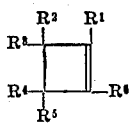

where the groups $R^1$, $R^2$, $R^3$, $R^4$, $R^5$ represent hydrogen or a variety of other substitutents and $R^6$ is acetoxy, phenyl, lower alkoxy, chloro, cyano or its common analogs such as carboxyl, alkoxycarbonyl, carbamoyl or N-alkylcarbamoyl with
(b) unsaturated or strained ring comonomers,
(2) alkoxycyclobutenes,
(3) homopolymers and copolymers of alkoxycyclobutenes, and
(4) a process for preparing the alkoxycyclobutenes.

The homopolymers and copolymers are useful as molded objects, films or fibers.

CROSS-REFERENCE TO RELATED APPLICATIONS

This application is a continuation-in-part of copending application, Ser. No. 828,788, filed May 28, 1969, now abandoned, which is a continuation-in-part of its copending application, Ser. No. 599,730, filed Dec. 7, 1966, issued as U.S. Pat. No. 3,459,647, on Aug. 5, 1969.

BACKGROUND OF THE INVENTION

(I) Field of the invention

This invention relates to copolymers of 1-cyanocyclobutenes, 1-carboxycyclobutenes, 1-alkoxycarbonylcyclobutenes, 1-carbamoylcyclobutenes and 1-(N-alkylcarbamoyl) cyclobutenes with one or more unsaturated or strained ring comonomers or mixtures of unsaturated and strained ring comonomers that undergo addition polymerization in the presence of free radical, anionic, cationic or coordination initiators.

The invention further relates to 2-alkoxy-1-substituted cyclobutenes, their homopolymers and a process for preparing 2-alkoxy-1-substituted cyclobutenes.

(II) Description of the prior art

The following references are of interest in connection with the present invention.

(1) U.S. Pat. No. 3,361,722 to Prem et al.
This reference discloses the polymerization of cyclobutene-1,2-dicyanide with a vinyl aromatic monomer.
(2) Brannock et al., J. Org. Chem. 29, 801 (1964) report a study of the cycloaddition of enamines with electrophilic olefins such as methyl acrylate, acrylonitrile, and diethyl maleate or fumarate. This reaction yields cyclobutanes of the structure:

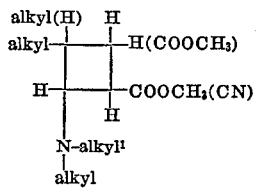

In the presence of base, the above cyclobutanes eliminate alkyl, alkyl¹NH to form cyclobutenes of the formula

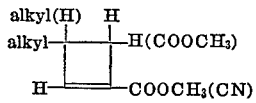

(3) Brannock et al., J. Org. Chem. 29, 940 (1964) report a limited extension of their enamine study of (2), in which they found that ketene diethylacetal reacted with methyl acrylate to give:

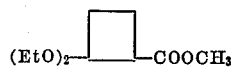

in good yield or with dimethyl fumarate to give a poor yield of:

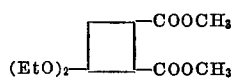

Dimethylketene dimethylacetal failed to react with methyl acrylate or diethyl fumarate, although it underwent condensation with the more electrophilic tetracyanoethylene.

The "O,N- and N,N-acetal" (Brannock's nomenclature) analogs of dimethylketone and dimethyl acetal

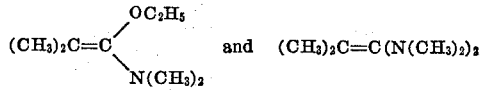

reacted with methyl acrylate to give, with accompanying loss of dimethyylamine, methyl-3,3-dimethylcyclobutene-1-carboxylate.

(4) U.S. Pats. 2,436,142 and 2,511,258, Jesse Harmon, are concerned with fluorocyclobutene polymers and copolymers, respectively. Completely fluorinated cyclobutenes are particularly preferred.

(5) U.S. Pat. 3,366,616, R. F. Tietz, is concerned with polymers having the following recurring structural units

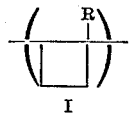

wherein R is a phenyl radical;

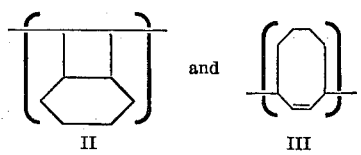

SUMMARY AND DDETAILS OF THE INVENTION

(I) Copolymers of 1-substitutedcyclobutenes

The 1-substitutedcyclobutenes are found to undergo addition copolymerization in the presence of free-radical, anionic, cationic, or coordination initiators with unsaturated or strained ring compounds which are capable of undergoing addition polymerization.

The cyclobutene monomers which are used to form the copolymers of this invention can be represented by the formula

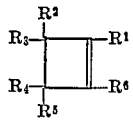

I.

wherein $R^1$ is hydrogen, hydrocarbyloxy of up to 8 carbon atoms; $R^2$, $R^3$, $R^4$, and $R^5$ may be hydrogen, hydrocarbyl of up to 16 carbon atoms, chloro, bromo or 3-cyanocyclobutyl; $R^6$ is acetoxy, phenyl, lower alkoxy, chloro, cyano, carboxyl, lower alkoxycarbonyl, carbamoyl, N-alkylcarbamoyl. The unsaturated or strained ring comonomers which are used to form the copolymers of this invention are those capable of undergoing addition polymerization in the presence of a free-radical, anionic, cationic or coordination initiator, and can be represented by the formula

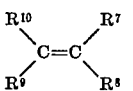

II wherein $R^7$ may be hydrogen, halogen, (e.g. F, Cl, Br), hydrocarbyl, lower alkoxy, cyano, carboxyl, lower alkoxycarbonyl, lower carbacyl or lower carbacyloxy; $R^8$ may be hydrogen, halogen, lower alkyl, phenyl, vinyl, halovinyl, loweralkylvinyl, cyano, methylpyridinyl or phenylene sodium sulfonate; $R^9$ may be hydrogen, halogen or lower alkoxycarbonyl; $R^8$ and $R^9$ taken together may be alkylene of 2–4 carbon atoms; $R^{10}$ may be hydrogen or halogen, or by the formula

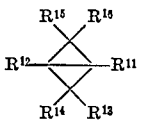

(III)

wherein $R^{11}$ and $R^{12}$ each are selected from hydrogen, halogen, hydroxyloweralkyl, hydroxyphenyl, halolower-alkyl, halophenyl, —COOH, —COOR, —COOM, —CONH$_2$, —CONHR, —CONR$_2$, —SO$_2$R, —CHO, —COR, —OCOR, —OR, —NO$_2$, —CN, or —R, wherein M is one equivalent of a metal cation and R is hydrocarbyl of up to 18 carbon atoms free of ethylenic and acetylenic carbon-to-carbon unsaturation; and $R^{13}$, $R^{14}$, $R^{15}$ and $R^{16}$ are each selected from hydroxy, amino, —NR$_2$ or $R^{11}$.

Thus, the unsaturated or strained ring polymerizable comonomers can be compounds such as vinyl monomers, for example, acrylonitrile, vinyl chloride, vinyl fluoride, styrene, acrylic acid, methacrylic acid, methyl acrylate, methyl methacrylate, ethyl acrylate, vinyl aetate, methyl vinyl ether, methyl vinyl ketone, sodium styrene sulfonate, methylvinylpyridine and the like; vinylidene monomers, such as isobutylene, α-methylstyrene, vinylidene chloride, vinylidene fluoride, vinylidene cyanide and the like; ethylene, propylene, 1,2-disubstituted ethylenes, such as fumaric and maleic esters, maleic anhydride and the like; polymerizable perhalogenated ethylenes, such as chlorotrifluoroethylene, tetrafluoroethylene and the like; conjugated diolefins, such as butadiene, isoprene, 1-chlorobutadiene, 2-chlorobutadiene, 2-cyanobutadiene, 2,3-dichlorobutadiene; cyclic olefins, such as cyclobutene, cyclopentene and the like; substituted cyclic olefins such as 1-cyanocyclobutenes chemically distinguishable from the other 1-cyanocyclobutene comonomer, 1-cyanocylopentene and the like; strained ring bicyclic and polycyclic compounds, such as 1-cyanobicyclo (1.1.0)butane, 3-chloro-1-cyanobicyclo(1.1.0)butane, 1-acetylbicyclo(1.1.0)butane and the like. A preferred group of ethylenically unsaturated monomers that are especially useful in forming the copolymers of this invention include those having the general formula

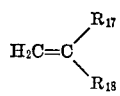

(IV)

wherein $R^{17}$ is selected from the group consisting of hydrogen, hydrocarbyl of up to 18 carbon atoms, cyano, acyl and acyloxy having 2–12 carbon atoms, alkoxycarbonyl having 2–19 carbon atoms, alkoxy having 1–18 carbon atoms, thioalkoxy, alkylsulfoxy, alkylsulfonyl, phenylene sodium sulfonate, phenyl, chlorine, bromine and fluorine; and $R^{18}$ is defined the same as $R^8$.

In the copolymers of this invention, the amount of polymerized ethylenically unsaturated and/or strained ring comonomer can be from one to 99 mole percent (i.e., as low as one mole percent polymerized cyclobutene), but preferably the amount of unsaturated and/or strained ring comonomer is limited to a maximum of 99 mole percent and a minimum of 50 mole percent. Conversely the polymers of this invention may be comprised of 1–99 mole percent polymerized cyclobutene, preferably 1–50 mole percent. The copolymers generally have an inherent viscosity of 0.1 or more.

The copolymers of this invention are prepared by reacting at a temperature of —100° to 160° C. at least one cyclobutene monomer of Formula I above with at least one unsaturated or strained ring polymerizable monomer defined as in Formulas II and III above in bulk, dispersion, emulsion or in solution in an inert organic solvent in the presence of an initiator selected from a free-radical generating initiator, an anionic initiator, a cationic initiator or a coordination-type initiator.

The free-radical-generating initiators may be selected from a wide variety of compounds. Included are the azo initiators such as α,α'-azodiisobutyronitrile, 1,1'-azodicyclohexanecarbonitrile, dimethyl α,α'-azodiisobutyrate and α,α'-azodiisobutyramide; the persulfates such as potassium persulfate and ammonium persulfate; and the organic peroxides and hydroperoxides such as dibenzoyl peroxide, di-t-butyl peroxide, and t-butyl hydroperoxide. The initiators can be used in proportions ranging from 0.01 to 10 weight percent of the comonomers being polymerized. Other sources of free radicals for initiating polymerization may also be used such as electron bombardment, ultraviolet light in the presence of a sensitizer and the like.

Suitable solvents and/or dispersion media for the free-radical copolymerizations include water, water containing sodium lauryl sulfate, hydrocarbons such as benzene and hexane, chlorinated aromatic hydrocarbons such as chlorobenzene, lactones such as γ-butyrolactone, nitriles such as acetonitrile, amides such as dimethylformamide and N-methylpyrrolidone, sulfoxides such as dimethylsulfoxide and tetramethylenesulfoxide and the like. As indicated above, it is not essential that a solvent or dispersion medium be used, and bulk polymerizations can be carried out.

A wide variety of anionic initiators are operable herein for the copolymerization of the cyclobutenes of Formula I. Representative anionic initiators that can be used include the alkali metal alkyls such as n-butyllithium and methyllithium; the alkali metal alkoxides such as potassium t-butoxide and sodium methoxide; and the alkali metal aryls such as sodium naphthalene. The concentration of anionic initiator employed can range from 0.01 to 10 weight percent of the monomers being polymerized.

Suitable reaction media for the anionic copolymerization include ethers such as diethyl ether, tetrahydrofuran, and the dimethyl ether of ethylene glycol; hydrocarbons such as benzene and hexane; chlorinated hydrocarbons such as chlorobenzene; and amides such as dimethylformamide.

Representative cationic initiators which may be used include boron trifluoride and trichloride, aluminum trichloride, silicon tetrafluoride, phosphorus and arsenic tri- and pentafluorides and chlorides, aluminum tribromide, titanium tetrachloride, ferric chloride and the like. The concentration of initiator may be from 0.01 to 10 weight percent of the monomers being polymerized.

Coordination-type initiators usually involve a combination of a lower valent transition metal chloride with an organometallic compound. Specific combinations which are useful include diisobutylaluminum chloride with vanadium tris(acetylacetonate), diisobutylaluminum chloride with vanadium oxychloride, triisobutylaluminum with titanium tetrachloride, methylmagnesium bromide with titanium tetrachloride, lithium aluminumtetradecyl with titanium tetrachloride and the like. The concentration of initiator may be from 0.01 to 10 weight percent of the monomers being polymerized.

Preferred reaction media for carrying out copolymerizations initiated by coordination-type catalysts are the hydrocarbons, particularly aliphatic hydrocarbons such as hexane and cyclohexane and the halogenated hydrocarbons such as tetrachloroethylene.

The reaction media for carrying out cationic-initiated copolymerizations are the same as those discussed for coordination-type copolymerizations.

Reaction times can vary from a few seconds (e.g. 5 sec.) to several days (e.g. two to three days or more) depending on the particular comonomers, initiator, solvent, and reaction temperature employed.

Pressures above and below atmospheric pressure are operable. Atmospheric and superatmospheric pressures are preferred.

The free-radical-initiated polymerization procedure is preferred.

The resulting copolymers contain the catenarian structural units

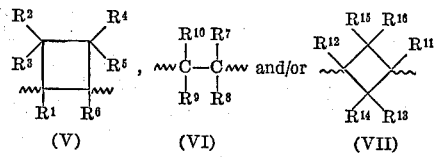

as shown by infrared and proton NMR spectral studies carried out on polymers of the Examples. The $R^1$ and $R^6$ can be arranged in more than one spacial configuration, i.e., the $R^1$ and $R^6$ may be positioned cis or trans; the polymer may be isotactic, syndiotactic etc. The cyclobutane catenarian unit may be linked in any manner with respect to the following unit, i.e., head-to-head, head-to-tail, or tail-to-tail. All of these configurations are included within the scope of this invention. In general, the copolymers of this invention have a greater stiffness modulus than the corresponding homopolymers prepared solely from the unsaturated polymerizable monomer. The increased stiffness is believed due to the presence of the cyclobutane ring in the polymer chain.

(II) Preparation of 2-alkoxy-1-cyanocyclobutenes

The 2-alkoxy-1-substituted cyclobutenes of this invention have the generic formula

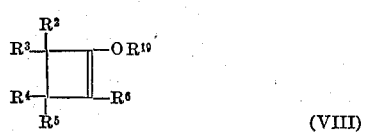

in which $R^{19}$ is hydrocarbyl, i.e. alkyl, aryl, aralkyl or alkaryl, of up to 8 carbon atoms and $R^2$, $R^3$, $R^4$, $R^5$ and $R^6$ are defined as above. The preferred compounds are those in which $R^6$ is CN.

The 2-alkoxy-1-substituted cyclobutenes employed in this invention are prepared from 2,2-dialkoxy-1-substituted cyclobutanes of the formula

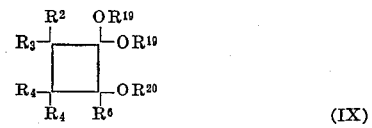

in which $R^2$ to $R^6$ and $R^{19}$, are defined as above, and $R^{20}$ is hydrogen, chlorine, bromine or iodine.

The intermediate cyclobutanes of Formula IX are prepared by cycloaddition of ketone acetals, or corresponding ortho-esters, to olefinic compounds according to Equation A:

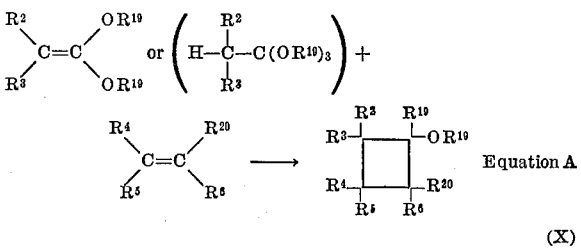

In constrast to the teaching of the prior art, treatment of the substituted cyclobutanes of Formula X, with anhydrous acid effects the removal of a molecule of $R^{19}$OH to yield the 2-alkoxy-1-substituted cyclobutenes of Formula VIII as in Equation B.

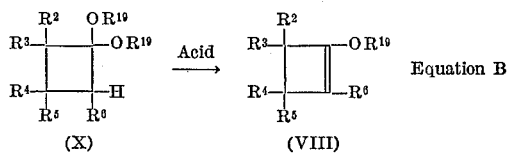

It is essential that the acids used as catalysts in this reaction be anhydrous in order to avoid secondary reactions with the enol ether product or the opening of the cyclobutane ring. Lewis acids and mineral acids such as $C_6H_5SO_3$, $CH_3SO_3H$, p-$CH_3$—$C_6H_4SO_3H$, $BF_3$, $H_2SO_6$, $H_3SO_7$, $PCl_5$, $PCl_3$, $POCl_3$, $P_2O_5$, and the like are operable. The mole ratio of catalyst to reactant range is 0.01:0.99, with 0.1:0.2 being the preferred ratio. Operable temperatures are 0–300° C. and operable reaction times are 0.1 sec. to 1 week. However, temperatures of 100–250° C. and reaction times of several hours are usually employed.

Known techniques for isolating the reaction product may be employed, such as distillation, sublimation, crystallization, and other well known procedures. In some cases the elimination of alcohol may go with basic catalysts or without added catalyst. At times, it is desirable to use one or more than one equivalent of catalyst, which then becomes a coreactant.

An alternative synthesis of the 2-alkoxy-1-substituted-cyclobutenes of Formula VIII may be carried out by treatment of a cyclobutane of Formula IX where $R^{20}$ is limited to chlorine, bromine or iodine and $R^2$–$R^6$ are as defined previously with a metal which, in effect, removes $OR^{19}$ and $R^{20}$ to form a carbon-carbon double bond as described by Equation C:

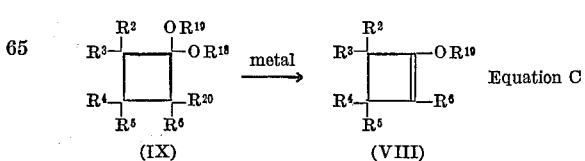

Metals of Groups I and II, and metals that behave similarly, are operable, although Group II metals such as Mg, Zn, Ca and Cd, are preferred. An equimolar amount or any molar excess of the metal may be employed, with a mole ratio of 0.90:1.10 of metal to cyclobutane preferred. Temperatures may range from −100 to +300° C. However, temperatures of −80 to +150° C. are preferred and temperatures of 0–100° C. are optimum. Although reaction times of 1 minute to 1 week are operable the usual reaction time is several hours. It is preferred that the reaction be carried out in an oxygen-free, carbon dioxide-free, dry system. The shorter reaction times are most useful in continuous tubular or autoclave reactors.

The cycloaddition of ketene acetals to olefinic compounds as shown in Equation A can be effected by thermal or photoinduced reaction of the reactants defined above. The thermal cycloaddition can be carried out in the temperature range of 100–300° C. The reactions are usually run at 100–200° C. and preferably at 150–200° C. The photocyclo addition is generally run at 0–70° C. and is preferably run at ambient temperature of about 20–40° C.

Many of the reactant ketene acetals and olefinic compounds, and all of the preferred reactants, are too volatile for reaction at atmospheric pressure and at the preferred temperature range. Consequently the thermal condensations are run in a closed reactor under autogenous pressure. This usually does not amount to more than a few atmospheres of pressure above atmosphere pressure. However, the cycloaddition may be run at pressures approaching 100 atmospheres. The photo reactions are customarily run at atmospheric pressure.

The thermal reactions are usually complete in a few hours, e.g., from 6–16 hours, but may be run for a full day or longer. Most photocyclo additions are rather slow and, for the intermediates of this invention, the photocyclo additions are run for from one to several days.

Solvents are not generally used, but are operable. Suitable solvents include benzene, acetonitrile, 1,2-dimethoxyethane (glyme), 1,5-dimethoxy-3-oxapentane (diglyme), tetrahydrofuran and other similar solvents.

Ordinarily, the reactants are used in equimolar ratio but any molar ratio from 0.1:0.9 to 0.9:0.1 can be used.

The photocyclo addition is usually run under conditions to realize absorption of the maximum light flux. Sensitizers may be employed to absorb the light and transfer energy to the reactants. Some sensitizers which may be employed are ketones, such as acetone, propiophenone, xanthone, benzophenone, Michler's ketone; aromatic hydrocarbons, such as benzene, triphenylene, anthracenes; dyes, such as methylene blue; and the like.

Suitable reactors are fabricated to permit immersion of light sources in a well within the reactor, tubular reactors inserted inside a helical high pressure mercury lamp, reactors surrounded by banks of suitable lamps and other reactors common to photoinduced reactions.

In the definitions of the various R groups in the formulas in this application, "hydrocarbyl" and "alkyl" terms are understood to be free of aliphatic ethylenic or acetylenic unsaturation. Hydrocarbyl groups containing up to 18 carbon atoms include alkyl such as methyl, tert.-butyl, octyl, dodecyl and octadecyl; cycloalkyl such as cyclopropyl, cyclobutyl, cyclopentyl, cyclohexyl, cyclooctyl and cyclooctadecyl; aryl such as phenyl, naphthyl, anthryl, biphenylyl and chrysenyl; aralkyl such as benzyl, phenethyl, naphthylmethyl and naphthylbutyl; alkaryl such as tolyl, butylphenyl, methylanthryl, and the like. The preferred compounds of this invention are those in which the hydrocarbyl groups contain up to 12 carbon atoms and particularly preferred are those in which the hydrocarbyl groups include alkyl, aryl, alkaryl and aralkyl groups of 8 carbon atoms or less. The terms lower alkyl, lower alkoxy, etc. involve alkyl groups of 6 or fewer carbon atoms.

SPECIFIC EMBODIMENTS OF THE INVENTION

The following nonlimiting examples are illustrative of the present invention. Unless otherwise specified, all temperatures are in ° C. and pressures are expressed in mm. of Hg.

(I) PREPARATION OF 1-CYANOCYCLOBUTENE

EXAMPLE 1

(A) Preparation of 1-bromocyclobutanecarbonitrile: A 500 ml. three-necked flask was charged with 1-bromocyclobutanecarboxamide (52 g., 0.292 mole) phosphorus pentoxide ($P_2O_5$) (56.5 g., 0.398 mole) and a magnetic stirrer bar. The flask was stoppered and shaken to insure an intimate mixture of the reagents and fitted to a distilling head. The flask was heated to about 150–170° C. and held at that temperature with an oil bath while the product was removed by distillation in vacuo, B.P. 93.5–95° C./48 mm. The receiver was then chilled, full aspirator vacuum applied and the receiver heated with a heat gun to insure complete removal of the 1-bromocyclobutanecarbonitrile (42.4 g., 90%), $n_D^{25}$ 1.4848. Redistillation gave 41.2 g. (88% overall yield, 97% recovery) of 1-bromocyclobutanecarbonitrile, B.P. 79–83° C./27 mm., $n_D^{25}$ 1.4840.

Analysis.—Calcd. for $C_5H_6BrN$ (percent): C, 37.52; H, 3.78; N, 8.75. Found (percent): C, 37.67; H, 4.03; N, 8.43.

(B) Preparation of 1-cyanocyclobutene: A 2-1. four-necked creased flask was flamed out and allowed to cool under nitrogen. 1-bromocyclobutanecarbonitrile (48 g., 0.3 mole) was added and diluted with 1-1. of hexane and 1 ml. of anhydrous ethyl ether. The solution was stirred and cooled to −20° C. as determined by an internal thermometer, followed by the slow addition of potassium t-butoxide (33.6 g., 0.3 mole) over 20 min. to effect dehydrohalogenation. When reaction was completed as indicated by gas chromatography, 10 g. of p-toluene sulfonic acid was added, and the solution flash distilled at 1.0–2.5 mm. pressure into a trap chilled in liquid nitrogen. The solvent was removed at 100 mm. followed by distillation of 3.1 g. (13%, 99% pure) of 1-cyanocyclobutene, B.P. −9 to −7° C./1.15–1.2 mm. (131–132° C./1 atm.).

EXAMPLE 2

(A) Preparation of 1,1-bis(dimethylamino)propane: Into a 2-liter flask fitted with a Dry Ice-acetone condenser, mechanical stirrer, thermometer and side arm with plug was charged 330 g. (7.3 moles) of dimethylamine. The dimethylamine was cooled to −60° C. and 174 g. (3 moles) of propionaldehyde cooled to −78° C. was added slowly in portions, the temperature being maintained at −50 to −40° C. After all of the aldehyde had been added, the temperature was allowed to increase to about −40 to −30° C., at which time 200 g. of anhydrous potassium carbonate was added and after the temperature had reached 0° C., the reaction mixture was cooled by means of ice-water. The reaction mixture was stirred overnight, the ice being allowed to melt. After standing overnight, the reaction mixture was filtered, the filter cake washed with a small volume of anhydrous ether and the combined filtrates were stirred with two changes of sodium hydroxide pellets. The reaction product was filtered, stirred with a magnetic stirrer and treated with small portions of finely powdered calcium hydride until there was very little hydrogen evolution on the addition of fresh calcium hydride. The reaction mixture was filtered, and the filtrate was concentrated, first at atmospheric pressure and finally at 25 mm. The 1,1-bis(dimethylamino)propane fraction boiling at 40° C. at 25 mm., was isolated, $n_D^{25}$ 1.4234–1.4240, weighed 215–285 g. (55–73%).

(B) Preparation of 2-dimethylamino-3-methylcyclobutanecarbonitrile: A mixture of 260 g. (2.0 moles) of 1,1-bis(dimethylamino)propane, 424 g. (8 moles) of acrylonitrile, 300 ml. of acetonitrile and about 0.1 g. each of hydroquinone and phenothiazine was stirred with a magnetic stirrer in a 2-liter flask fitted with a reflux condenser under an atmosphere of nitrogen. The temperature was increased rapidly to about 70–75° C., whereupon an exothermic reaction occurred and some dimethylamine distilled from the reaction mixture. The reaction temperature reached 85–88° C. during the course of about thirty minutes and the reaction mixture was refluxed for an additional period of 18–20 hr. The reaction mixture was distilled rapidly through a short column into a flask cooled to −78° C. first at water pump pressure and finally at vacuum pump pressure (0.1–0.5 mm.). The distillate was fractionated, the acetonitrile and excess acrylonitrile being recovered and used in subsequent runs. Fractionation of the residue through a Fenske-ring packed column gave slightly more than the theoretical amount of 3-dimethylaminopropionitrile, B.P. 20–23° C./0.1 mm., $n_D^{25}$ 1.4240 and 244 g. (88%) of 2-dimethylamino-3-methylcyclobutanecarbonitrile, B.P. 35° C./0.1 mm., $n_D^{25}$ 1.4490.

Analysis.—Calcd. for $C_8H_{14}N_2$ (percent): C, 69.52; H, 10.21; N, 20.27. Found (percent): C, 69.53; H, 10.56; N, 20.40.

(C) Preparation of 3-methyl-1-cyanocyclobutene: Into a 4-necked, 1-liter flask fitted with a mechanical stirrer, thermometer, dropping funnel and air condenser was added first 330 g. (1.78 moles) of methyl p-toluenesulfonate followed by about 20 ml. of 2-dimethylamino-3-methylcyclobutanecarbonitrile. The reaction vessel was flushed with nitrogen and the temperature was increased to about 80° C. whereupon an exothermic reaction took place. A total of 220 g. (1.6 moles) of the dimethylaminocyclobutanecarbonitrile was added in small portions with external cooling, the temperature being maintained at 85–95° C. As soon as the exothermic reaction had ceased, the thick mixture was heated on a steam bath with stirring under a nitrogen atmosphere for 18–20 hr., the internal temperature being 94–96° C. The steam was turned off and 50 ml. of tert.-butyl alcohol was added slowly, the mixture was transferred to a 3-l. beaker and the flask was rinsed first with a 50-ml. portion and finally with a 20-ml. portion of tert.-butyl alcohol. A solution of 160 g. of 85% potassium hydroxide in 210 ml. of water (cooled to 20° C.) was added rapidly in one portion with stirring. The reaction mixture rapidly set to a thick paste of potassium p-toluenesulfonate and it was necessary to add an additional 25 ml. of water in order to obtain a mixture that could be stirred. After stirring for 20 min. at 30° C., an additional 50 ml. of water was added and the mixture stirred for an additional period of 10 min. Water was added to the reaction mixture until the final volume was 3 liters. One pound of sodium chloride was added and the organic layer was separated. The aqueous layer was extracted eight times with ether and the combined organic layers extracted with dilute hydrochloric acid until the organic layer was free of trimethylamine. The ethereal solution was washed twice with saturated sodium chloride solution, then dried with anhydrous magnesium sulfate and most of the ether was distilled at atmospheric pressure on a steam bath. Fractionation of the residue gave 108 g. (77%) of 3-methyl-1-cyanocyclobutene, B.P. 55° C./30 mm., $n_D^{25}$ 1.4483.

EXAMPLE 3

(A) Preparation of 1-(N-pyrrolidino)heptene: A dry, nitrogen-blanketed 1-l. creased flask fitted with an alcohol thermometer, mechanical stirrer, condenser with nitrogen inlet and 250-ml. addition funnel with nitrogen inlet was charged with 284 g. (4.0 mole) of pyrrolidine and 100 g. (0.725 mole) of potassium carbonate. The stirred mixture was cooled to −10° C. (internal temperature) and 228 g. (2.0 mole) of heptaldehyde was added dropwise, as the temperature was maintained at −10 to 0° C. with a Dry-Ice/acetone bath. After the addition was complete, the bath was removed and the mixture allowed to stand overnight at room temperature and then filtered under nitrogen pressure. The filter cake was washed with anhydrous ether and the filtrate fractionated to afford 319 g. (65%) of 1-(N-pyrrolidino)heptene, B.P. 40–53° C./ 0.1–0.35 mm., structure established by infrared and NMR.

(B) Preparation of 3-pentyl-2-pyrrolidino-1-cyanocyclobutane: 1-(N-pyrrolidino)heptene (219 g., 1.31 mole), acrylonitrile (69.4 g., 1.31 mole), hydroquinone (0.5 g.) and acetonitrile (392 ml.) were combined in a dry, nitrogen-blanketed, 1-l. flask fitted with a magnetic stirrer bar, condenser, and thermometer. The stirred mixture was refluxed for 5.5 hr., allowed to stand overnight at room temperature and fractionated to afford 110 g. (38%) of 3-pentyl-2-pyrrolidino-1-cyanocyclobutane, B.P. 35.5–41° C./0.075–0.13 mm.

(C) Preparation of pentyl - 1 - cyanocyclobutene: 3-pentyl-2-pyrrolidino - 1 - cyanocyclobutane (110 g., 0.5 mole) and methyl p-toluenesulfonate (111 g., 0.6 mole) were mixed in a 1-l. flask, the temperature of the reaction held below 100° C. by means of an ice bath. After 1 hr., 100 ml. of tert.-butyl alcohol was added to dissolve the semi-solid mixture, followed by the addition of 100 ml. of a 10 M potassium hydroxide solution. The mixture was stirred at 40–45° C. for 15 min., poured into 1-l. of water and allowed to stand for 30 min. The layers were separated and the aqueous phase extracted with four 100-ml. portions and one 100-ml. portion of ether. The organic phase and ethereal extracts were combined, washed with 5% HCl solution until the washings were slightly acid, two 200-ml. portions of water, two 200-ml. portions of saturated salt solution and dried over anhydrous magnesium sulfate after the addition of a trace of hydroquinone. The ethereal solution was filtered, concentrated and the residue fractionated to afford 41.8 g. (56%) of 3-pentyl-1-cyanocyclobutene, B.P. 36° C./0.06 mm. The infrared, ultraviolet, Raman and NMR spectra were consistent with the proposed structure.

Analysis.— Calcd. for $C_{10}H_{15}N$ (percent): C, 80.48; H, 10.13; N, 9.39. Found (percent): C, 80.43, 80.48; H, 9.92, 9.91; N, 10.10, 10.01.

EXAMPLE 4

(A) Preparation of 1,3 - dibromocyclobutanecarbonitrile: To a magnetically stirred solution of 15.8 g. (0.2 mole) of 1-cyanobicyclo[1.1.0]butane (British Pat. No. 1,141,445) in 100 ml. carbon tetrachloride at room temperature was added over 1 hr. a solution of 32 g. (0.2 mole) of bromine in 200 ml. carbon tetrachloride. The bromine color discharged as rapidly as the bromine solution was added for at least 90% of the reaction. After the addition was completed, the resulting light-orange solution was rotary evaporated to give 47.3 g. (99%) of white crystalline solid. Gas chromatography showed the presence of only two peaks in approximate ratios of 3 to 1. Preparative gas chromatography at 125° C. gave two white solids, isomer A (major, 67–74% of mixture), M.P. 66.5–67.5° C. and isomer B (minor, 33–26% of mixture), M.P. 88.5–89.5° C. On the basis of the NMR spectra, it was possible to assign the cis-1,3-dibromocyclobutanecarbonitrile structure to isomer A and the trans-1,3-dibromocyclobutanecarbonitrile structure to isomer B. It was found in other preparations that the major cis isomer could be obtained pure by several recrystallizations of the product mixture from methanol.

Analysis.—Calcd. for $C_5H_5NBr_2$ (percent): C, 25.13; H, 2.11; N, 5.86; Br, 66.89. Found, Isomer A (percent): C, 25.10; H, 2.37; N, 5.92; Br, 66.18. Found, Isomer B (percent): C, 25.35; H, 2.10; N, 5.99; Br. 66.57.

(B) Preparation of 3-bromo-1-cyanocyclobutene: In a 500 ml. 3-necked flask, flamed out and maintained under nitrogen, was placed 44.4 g. of sodium hydride dispersion in mineral oil. The mineral oil was removed by several washings with pentane. To the sodium hydride was added 200 ml. of tetrahydrofuran and 47.8 g. of 1,3-dibromocyclobutanecarbonitrile. The mixture was refluxed to 48 hr., cooled and 60 ml. of water was cautiously added. The mixture was then diluted with 200 ml. of chloroform, dried, filtered and the solvent evaporated. The residue was distilled twice to give a center cut of 6.3 g. (20%) of colorless 3-bromo-1-cyanocyclobutene, B.P. 55° C./ 2.0 mm.

*Analysis.*—Calcd. for $C_5H_4NBr$ (percent): C, 38.00; H, 2.55; N, 8.87; Br, 50.88. Found (percent): C, 37.88; H, 2.80; N, 8.86, 9.04, Br. 50.21.

EXAMPLE 5

Preparation of 3-(3-cyanocyclobutyl)-1-cyanocyclobutene

A solution of 4 ml. of 1-cyanobicyclo[1.1.0]butane in 30 ml. of cyclohexane (distilled from calcium hydride) was added by syringe to a 50-ml. flask equipped with a magnetic bar, nitrogen inlet and opening sealed with a serum cap. The stirred mixture was heated at 100° C. for 21 hr., cooled, filtered and the filtrate eluted from Florisil® (the Floridin Company's synthetic magnesium-modified silica gel) to afford two fractions totaling 0.40 g. (12.5%) of 3-(3-cyanocyclobutyl)-1-cyanocyclobutene, M.P. 72–74.5° C. and 77–78.5° C. after sublimation at 75° C./0.025 mm.

EXAMPLE 6

(A) Preparation of 1-cyano-3-methylcyclobutene-2: In a 1-liter, round-bottomed, 1-necked flask was placed 330 g. of 8-mesh soda lime. The flask was fitted with a Claisen head with a 250 ml. nonequilibrated addition funnel mounted so that drops would fall directly onto a small area of the soda lime. The other end of the Claisen head was attached to a water-cooled 40-ml. vacuum distillation fraction collector. The system was evacuated to 15–20 mm. with a water aspirator and the soda lime heated to 150–160° C. in an oil bath. When the water had ceased distilling at an appreciable rate, the pressure was raised to 60 mm. (by bleeding in nitrogen) and 658 g. (2.98 moles) of 1-cyano-3-iodo-3-methylcyclobutane was added. The addition was performed fairly slowly at first (8 drops per min.) and after a few minutes, the first material began to distill over. The product was collected in about 25-ml. cuts and dried over sodium sulfate. The composition of the cuts was monitored by IR, and the first cuts were found to be almost pure 1-cyano-3-methylbicyclobutane. After about 250 ml. had been added, the product distilling contained essentially no bicyclobutane. At this point, the pressure was increased to 120 mm. and the rest of the iodo compound was added very rapidly. The mixture was maintained at 150–160° C., and about 120 mm. for five minutes. The pressure was then reduced to 60 mm. and the product distilled off. The earlier cuts which contained bicyclobutane were (after being dried over sodium sulfate) added to the system at a pressure of 120 mm., and the pot was maintained at 150–160° C. and 120 mm. for five minutes. The pressure was then reduced to 60 mm. and the distillate collected. The pressure was then reduced to about 1 mm. and any volatile material remaining was collected.

The collected distillates from above were diluted with an equal volume of ether, washed with sodium bisulfite solution, water, and saturated brine, and then dried with magnesium sulfate. The bulk of the ether was removed on the rotary evaporator to yield 207.6 g. of crude product.

The crude olefin mixture of 1-cyano-3-methylcyclobutene-2 and 3-methylenecyclobutanecarbonitrile from three such runs (2200 g. or 10 moles) of 1-cyano-3-iodo-3-methylcyclobutane and 1103 g. of soda lime was collectively distilled to yield 327.7 g. of material with B.P. 71–78° C./30 mm. The overall yield of distilled olefins (from iodide) was 41%.

The olefin mixture was divided into two portions and each portion dissolved in 1310 ml. of carbon tetrachloride. These solutions were washed successively with 75 ml., 50 ml., 50 ml., and 25 ml. of a solution containing 1.3 g. of silver·nitrate per ml. (of solution). The solutions were then washed with 100 ml. of distilled water and dried over magnesium sulfate. The solvent was removed on the rotary evaporator (with some loss of product by co-distillation). From the 327.7 g. were obtained 266.8 g. of product. The 50.5 g. portion was dissolved in 400 ml. of $CCl_4$ and washed with 25, 20, 20, 10 and 10 ml. of the silver nitrate solution, followed by water as before. This yielded an additional 21 g. of product. The infrared spectra of these samples indicates that most of the 1-cyano-3-methylenecyclobutane had been removed.

The above products were vacuum distilled through a short Vigreaux column to give 198.0 g. of material boiling at 72° C./30 mm., from the main product and 17.4 g. from the second sample for a total of 215 g. This constitutes a net yield for the overall isomerization of 16.5%.

*Analysis.*—Calcd. for $C_6H_7N$ (percent): C, 77.38; H, 7.58; N, 15.04. Found (percent): C, 76.76, 76.77, 76.29, 76.39; H, 7.62, 7.83, 7.53, 7.59; N, 15.46, 14.88, 14.74.

(B) Preparation of 1-cyano-2,3-dibromo-3-methylcyclobutane: A solution of 41.6 g. (0.447 mole) of 1-cyano-3-methylcyclobutene-2 in 724 ml. of carbon tetrachloride was obtained by dilution of the carbon tetrachloride solution used in the silver nitrate purification (the amount of olefin present being determined by comparison of the IR of the solution with those solutions of known concentrations). This solution was cooled to 0° C. and to it was added a solution of 71.3 g. of bromine (0.447 mole) in 250 ml. of carbon tetrachloride. The addition was carried out over a period of about 3½ hours. At the end of this time, the solution was washed with sodium bisulfite solution, twice with water, once with brine and it was then dried over magnesium sulfate. The solution began to turn pink and was quickly filtered. The solvent was removed on the rotary evaporator and most of the 1-cyano-2,3-dibromo-3-methylcyclobutane crystallized on standing. The NMR indicates some 1-cyano-1,2-dibromo-3-methylcyclobutane is present. Yield, 104.6 g. (92.7%).

(C) Preparation of 3-bromo-3-methyl-1-cyanocyclobutene: In a two-liter, round-bottomed flask was placed 24 g. (0.535 mole) of 53% sodium hydride-mineral oil dispersion, the flask was flushed with nitrogen and 100 ml. of anhydrous ether was added. The mixture was stirred (under nitrogen), allowed to settle and the ether removed via a filter stick. This process was repeated three times in order to remove the bulk of the mineral oil. Next 800 ml. of anhydrous ether was added and then a solution of 101.2 g. (0.40 mole) of the crude 1-cyano-2,3-dibromo-3-methylcyclobutane in 200 ml. of ether was added. This mixture was stirred at room temperature for seven days.

At the end of this period, the flask was thoroughly cooled in an ice-bath and 42 ml. of methanol was cautiously added. Hydrogen was evolved with considerable vigor during the addition of the first 20 ml. After addition was complete (about 1 hour), the solution was treated with 211 ml. of water. The ether layer was separated and the aqueous phase was washed with two 50 ml. portions of ether. The combined ether extracts were washed with 100 ml. of water and dried with magnesium sulfate. After filtration, the solvent was removed on the rotary evaporator to yield 63.9 g. of crude product. This product was distilled in a short path distillation apparatus to yield 52.4 g. of a colorless liquid. The NMR indicated that it was a mixture. Consequently, the bulk of the material was fractionated through a platinum spiral column to afford 32.5 g. (49.3%) of 3-bromo-3-methyl-1-cyanocyclobutene. B.P. 39–42° C./0.4 mm. The structure was established by NMR and elemental analysis.

*Analysis.*—Calcd. for $C_6H_6BrN$ (percent): C, 41.89; H, 3.52; N, 8.14. Found (percent): C, 41.76, 41.98; H, 3.42, 3.60; N, 8.69, 8.81.

(II) COPOLYMERIZATIONS OF 1-CYANOCYCLOBUTENES

EXAMPLE 7

A clean, nitrogen-swept, screw-capped glass tube was charged with 0.05 g. of 1-cyanocyclobutene, 0.335 g. of acrylonitrile, 4.7 ml. of oxygen-free deionized water, 0.25 ml. of potassium persulfate solution (1.0 g. potassium persulfate in 1.25 ml. of oxygen-free deionized water), 0.1 ml. of sulfuric acid-ferrous ion solution (64 ml. of 0.1 N sulfuric acid and 0.016 g. of ferrous ammonium sulfate hexahydrate in 128 ml. of oxygen-free deionized water) and 0.08 ml. of sodium metabisulfite solution (6.0 g. of sodium metabisulfite in 100 ml. of oxygen-free deionized water). The tube was capped and rotated in a 50° C. water bath for 35 min. Anhydrous sodium sulfate was added to coagulate the polymer which was filtered, washed with water and methanol and air dried. Copolymer was obtained in 44.3% conversion incorporting 21% of 1-cyanocyclobutene, inherent viscosity 1.33 at 0.1% concentration in dimethylformamide at 25° C.

EXAMPLE 8

A mixture of 1-cyanobicyclo(1.1.0)butane and 1-cyanocyclobutene can be polymerized to form a heat-stable thermoplastic which finds usefulness in ordinary thermoplastic applications. For example, a 90-mg. sample of a 3.5:1 mixture of 1-cyanocyclobutene and 1-cyanobicyclobutane was heated with a trace of azobisisobutyronitrile. A chloroform-insoluble, high-softening thermoplastic, heat-stable solid copolymer was formed.

EXAMPLE 9

A clean, nitrogen-swept, screw-capped glass tube was charged with 0.13 g. of 1-cyanocyclobutene, 0.87 g. of acrylonitrile, 7.5 ml. of oxygen-free deionized water, 0.62 ml. of potassium persulfate solution, 0.25 ml. of sulfuric acid-ferrous ion solution and 0.6 ml. of sodium metabisulfite solution. The tube was capped and rotated in a 50° C. water bath for 35 min. Anhydrous sodium sulfate was added to coagulate the polymer, which was filtered, washed and methanol and air dried. Copolymer was obtained in 82% conversion incorporating 19.5% of 1-cyanocyclobutene, inherent viscosity 1.15 at 0.1% concentration in dimethylformamide at 25° C.

A film was cast from a 15% solution of 0.82 g. of the copolymer in dimethylformamide using a 10 mil knife, dried at 75° C. for 3 hours and extracted with cold water. Cut strips of the film were drawn 4× and 8× over a heated roll at 130° and 180° C., respectively, followed by boiling off.

|  | 90° C. wet properties 8× |
|---|---|
| Tenacity (g./d.) | 0.38 |
| Elongation at break (percent) | 18.6 |
| Initial modulus (g./d.) | 4.37 |

A second film was prepared, dried, extracted with warm water, cut and drawn 4× and 8× over a heated roll at 140° and 180° C., respectively, followed by boiling off.

|  | 90° C. wet properties | |
|---|---|---|
|  | 4× | 8× |
| Tenacity (g./d.) | 0.38 | 0.62 |
| Elongation at break (percent) | 37.8 | 14.7 |
| Initial modulus (g./d.) | 5.5 | 7.3 |

EXAMPLE 10

A clean, nitrogen-swept, screw-capped glass tube was charged with 0.13 ml. of 1-cyanocyclobutene, 0.87 g. of acrylonitrile, 4.0 ml. of dimethyl sulfoxide and 0.15 ml. of a 0.2 M solution of azobisisobutyronitrile in dimethyl sulfoxide. The tube was capped and placed in a 65° C. water bath for three hours. A second portion of catalyst was added and the tube replaced in the bath for another 3 hours. The precipitated copolymer was filtered, washed with water and methanol and air dried. Copolymer was obtained in 85% conversion incorporating 19.1% of 1-cyanocyclobutene, inherent viscosity 1.05 at 0.1% concentration in dimethylformamide at 25° C.

EXAMPLE 11

A clean, nitrogen-swept, screw-capped glass tube was charged with 0.13 g. of 1-cyanocyclobutene, 1.08 ml. of acrylonitrile, 4.0 ml. of dimethyl sulfoxide and 0.15 ml. of a 0.2 M solution of azobisisobutyronitrile in dimethyl sulfoxide. The tube was capped and placed in a 65° C. water bath for 4 hrs., followed by the addition of another portion of catalyst. After 2 hrs., at 65° C. the reaction mixture was heated overnight at 75° C. The precipitated copolymer was filtered, washed with water and methanol and air dried. Copolymer was obtained in 96% conversion, inherent viscosity 1.14 at 0.1% concentration in dimethylformamide at 25° C.

A film was cast from a 20% solution of the copolymer in dimethylformamide using a 10 mil knife, dried at 75° C. for 3 hrs. and extracted with warm water. Cut strips of the film were drawn 4× and 8× over a heated roll at 130° and 170° C. respectively, followed by boiling off.

|  | 90° C. wet properties | |
|---|---|---|
|  | 4× | 8× |
| Tenacity (g./d.) | 0.27 | 0.61 |
| Elongation at break (percent) | 17.2 | 15.9 |
| Initial modulus (g./d.) | 5.37 | 8.0 |

EXAMPLE 12

A clean, nitrogen-swept, screw-capped glass tube was charged with 0.25 ml. of 1-cyanocyclobutene, 0.95 ml. of acrylonitrile, 3.5 mil. of oxygen-free deionized water, 0.63 ml. of potassium persulfate solution, 0.25 ml. of sulfuric acid-ferrous ion solution and 0.60 ml. of sodium metabisulfite solution. The tube was capped and rotated in a 50° C. water bath for 30 min., cooled, filtered twice, washed with water and methanol and air dried. Copolymer was obtained in 90% conversion, inherent viscosity 1.46 at 0.1% concentration in dimethylformamide at 25° C.

A film was cast from a 15% solution of the polymer in dimethylformamide using a 10 mil knife, dried at 75° C. for 3 hrs. and extracted with warm water. Cut strips of the film were drawn 4× and 8× over a heated roll at 133° and 170° C. respectively, followed by boiling off.

|  | 90° C. wet properties | |
|---|---|---|
|  | 4× | 8× |
| Tenacity (g./d.) | 0.27 | 0.37 |
| Elongation at break (percent) | 31.6 | 16.9 |
| Initial modulus (g./d.) | 4.47 | 5.42 |

EXAMPLE 13

A clean, nitrogen-swept, screw-capped glass tube was charged with 0.45 ml. of 1-cyanocyclobutene, 1.32 ml. of acrylonitrile, 5.23 ml. of oxygen-free distilled water, 0.95 ml. of potassium persulfate solution, 0.38 ml. of sulfuric acid-ferrous ion solution and 0.90 ml. of sodium metabisulfite solution. The tube was capped and rotated in a 50° C. water bath for 1.5 hrs. and cooled. Anhydrous sodium sulfate was added to coagulate the copolymer which was filtered, washed with water and air dried. Copolymer was obtained in 82.8% conversion incorporating 16.4% of 1-cyanocyclobutene, inherent viscosity 1.27 at 0.1% concentration in dimethylformamide at 25° C.

A film was cast from a 20% solution of the copolymer in dimethylformamide using a 10 mil knife, dried at 75° C. for 2 hrs. and extracted with warm water. Cut strips of the film were drawn 4× and 8× over a heated roll at 135° C. and 200° C. respectively, followed by boiling off.

|  | 90° C. wet properties | |
|---|---|---|
|  | 4× | 8× |
| Tenacity (g./d.) | 0.19 | 0.29 |
| Elongation at break (percent) | 37.9 | 14.0 |
| Initial modulus (g./d.) | 2.4 | 3.7 |

EXAMPLE 14

A clean, nitrogen-swept, screw-capped glass tube was charged with 0.104 ml. of 1-cyanocyclobutene, 0.156 ml. of 1-cyanobicyclo(1.1.0)butane, 2.16 ml. of acrylonitrile, 12 ml. of oxygen-free deionized water, 1.24 ml. of potassium persulfate solution, 0.5 ml. of sulfuric acid-ferrous ion solution and 1.2 ml. of sodium metabisulfite solution. The tube was capped and rotated in a 50° C. water bath for 1 hr., allowed to stand overnight at room temperature and the contents filtered, washed with water and methanol and air dried. Terpolymer was obtained in 96.5% conversion incorporating 20.2% of a mixture of 1-cyanocyclobutene and 1-cyanobicyclo(1.1.0)butane, inherent viscosity 1.32 at 0.1% concentration in dimethylformamide at 25° C.

A film was cast from a 15% solution of the copolymer in dimethylformamide using a 10 mil knife, dried at 75° C. for 3 hrs., and extracted with warm water. Cut strips of the film were drawn 4× and 8× over a heated roll at 140° and 180° C., respectively, followed by boiling off.

|  | 90° C. wet properties | |
|---|---|---|
|  | 4× | 8× |
| Tenacity (g./d.) | 0.39 | 0.83 |
| Elongation at break (percent) | 59.1 | 17.4 |
| Initial modulus (g./d.) | 4.3 | 5.8 |

EXAMPLE 15

A clean, nitrogen-swept, screw-capped glass tube was charged with 0.104 ml. of 1-cyanocyclobutene, 0.156 ml. of 1-cyanobicyclo(1.1.0)butane, 2.16 ml. of acrylonitrile, 8.0 ml. of dimethyl sulfoxide and 0.30 ml. of a 0.2 M solution of azobisisobutyronitrile in dimethyl sulfoxide. The tube was capped and placed in a 65° C. water bath for 6 hr., cooled, and the contents filtered, washed with water and methanol and air dried. Terpolymer was obtained in 64.5% conversion incorporating 10.1% of a mixture of 1-cyanocyclobutene and 1-cyanobicyclo(1.1.0) butane, inherent viscosity 2.00 at 0.1% concentration in dimethylformamide at 25° C.

EXAMPLE 16

A clean, nitrogen-swept, screw-capped glass tube was charged with 0.104 ml. of 1-cyanocyclobutene, 0.156 ml. of 1-cyanobicyclo(1.1.0)butane, 2.16 ml. of acrylonitrile, 8 ml. of dimethyl sulfoxide and 0.3 ml. of a 0.2 M solution of azobisisobutyronitrile in dimethyl sulfoxide. The tube was capped and placed in a 65° C. water bath for 6 hr., cooled, the contents filtered, washed with water and methanol and air dried. Terpolymer was obtained in 63.5% conversion, inherent viscosity 2.10 at 0.1% concentration in dimethylformamide at 25° C.

A film was cast from a 15.5% solution of the copolymer in dimethylformamide using a 10 mil knife, dried for 3 hr., at 75° C., and extracted with warm water. Cut strips of the film were drawn 4× and 8× over a heated roll at 130° C. and 170° C., respectively, followed by boiling off.

|  | 90° C. wet properties | |
|---|---|---|
|  | 4× | 8× |
| Tenacity (g./d.) | 0.44 | 0.85 |
| Elongation at break (percent) | 47.9 | 17.1 |
| Initial modulus (g./d.) | 4.17 | 6.88 |

EXAMPLE 17

A clean, nitrogen-swept, screw-capped glass tube was charged with 0.30 ml. of 3-methyl-1-cyanocyclobutene, 2.0 ml. of acrylonitrile, 7.0 ml. of oxygen-free deionized water, 1.25 ml. of potassium persulfate solution, 0.50 ml. of sulfuric acid-ferrous ion solution and 1.20 ml. of sodium metabisulfite solution. The tube was capped and rotated in a 50° C. water bath for 1 hr. Copolymer was obtained in 85% conversion incorporating 10.2% of 3-methyl-1-cyanocyclobutene, inherent viscosity 1.23 at 0.1% concentration in dimethylformamide at 25° C.

A film was cast from a 20% solution of the copolymer in dimethylformamide using a 10 mil knife, dried overnight at 75° C. and extracted with warm water. Cut strips of the film were drawn 4× and 8× over a heated roll at 140° and 170° C., respectively, followed by boiling off.

|  | 90° C. wet properties | |
|---|---|---|
|  | 4× | 8× |
| Tenacity (g./d.) | 0.19 | 0.58 |
| Elongation at break (percent) | 24.3 | 19.8 |
| Initial modulus (g./d.) | 2.85 | 6.01 |

EXAMPLE 18

A clean, nitrogen-swept, screw-capped glass tube was charged with 0.50 ml. of 3-methyl-1-cyanocyclobutene, 1.90 ml. of acrylonitrile, 7.0 ml. of oxygen-free deionized water, 1.25 ml. of potassium persulfate solution. 0.50 ml. of sulfuric acid-ferrous ion solution and 1.25 ml. of sodium metabisulfite solution. The tube was capped and rotated in a 50° C. water bath for 1.5 hr. Anhydrous sodium sulfate was added to coagulate the milky polymerization mixture, which was filtered, washed with water and methanol and air dried. Copolymer was obtained in 82% conversion incorporating 24.1% of 3-methyl-1-cyanocyclobutene, inherent viscosity 0.85 at 0.1% concentration in dimethylformamide at 25° C.

A film was cast from a 20% solution of the copolymer in dimethylformamide using a 10 mil knife, dried and extracted with warm water. Cut strips of the film were drawn 4× and 8 over a heated roll at 140° and 175° C., respectively, followed by boiling off.

|  | 90° C. wet properties | |
|---|---|---|
|  | 4× | 8× |
| Tenacity (g./d.) | 0.21 | 0.37 |
| Elongation at break (percent) | 59.4 | 22.7 |
| Initial modulus (g./d.) | 1.9 | 4.6 |

EXAMPLE 19

A clean, nitrogen-swept, screw-capped glass tube was charged with 1.0 ml. 3-methyl-1-cyanocyclobutene, 1.25 ml. acrylonitrile, 7.0 ml. oxygen-free deionized water, 1.25 ml. potassium persulfate solution, 0.5 ml. sulfuric acid-ferrous ion solution and 1.20 ml. sodium metabisulfite solution. The tube was capped and rotated in a 50° C. water bath for 2 hrs. The copolymer was coagulated by addition of anhydrous sodium sulfate, filtered, washed with water and methanol and air dried. Copolymer was obtained in 75.5% conversion incorporating 46.8% of 3-methyl-1-cyanocyclobutene, inherent viscosity 0.67 in 0.1% concentration in dimethylformamide at 25° C.

EXAMPLE 20

A clean, nitrogen-swept, Pyrex® pressure bottle was charged with 6.0 g. of 3-methyl-1-cyanocyclobutene, 6.0 g. of ethyl acrylate, 12.0 g. of 2-butanone and 0.24 g. of azodiisobutyronitrile. The bottle was sealed and tumbled in a 70° C. water bath for 16 hr. Copolymer was obtained in 74.6% conversion containing 42.2% of 3-methyl-1-cyanocyclobutene, inherent viscosity 0.11 at 0.5% concentration in 2-butanone at 30° C.

Films were cast on auto body-primed Bonderite panels from a 37.3% solution of the copolymer in 2-butanone using a 10 mil knife, air dried 30 min. at ambient temperature and baked 30 min. at 300° F. (149° C.). The resulting 2 mil films had a 20° gloss of 77 and Tukon hardness 9.4 Knoop.

EXAMPLE 21

A clean, nitrogen-swept, screw-capped glass tube was charged with 0.3 g. of 3-methyl-1-cyanocyclobutene, 1.90 ml. of styrene, 7.0 ml. of oxygen-free distilled water, 0.7 ml. of sodium lauryl sulfate solution (1.0 g. of sodium lauryl sulfate in 10 ml. of oxygen-free distilled water), 1.25 ml. of potassium persulfate solution, 0.5 ml. of sulfuric acid-ferrous ion solution and 1.2 ml. of sodium meta bisulfite solution. The tube was capped and rotated at 56° C. for 4 hrs., cooled and sufficient 20% potassium carbonate solution was added to adjust the pH of the suspension to 7.0–7.5. The suspension was transferred to a beaker, the tube rinsed with distilled water and the copolymer coagulated by the addition of aluminum potassium sulfate, filtered, rinsed with water, methanol and ether, and dried to constant weight at 50° C. and 20 mm. pressure over phosphorus pentoxide. Copolymer was obtained in 95% conversion, inherent viscosity 1.35 at 0.5% concentration in chloroform at 25° C.

A film was cast from a 20% solution of the copolymer in chloroform using a 10 mil knife.

EXAMPLE 22

A clean, nitrogen-swept, screw-capped glass tube was charged with 0.6 g. of 3-methyl-1-cyanocyclobutene, 1.55 ml. of styrene, 7.0 ml. oxygen-free distilled water, 0.7 ml. of sodium lauryl sulfate solution (1.0 g. of sodium lauryl sulfate in 10 ml. of oxygen-free distilled water), 1.25 ml. of potassium persulfate solution, and 0.25 ml. of sulfuric acid-ferrous ion solution, and 1.2 ml. of sodium metabisulfite solution. The tube was capped and rotated at 56° C. for 4 hr., cooled and sufficient 20% potassium carbonate solution was added to adjust the pH of the suspension to 7.0–7.5. The suspension was transferred to a beaker, the tube rinsed with distilled water and the copolymer coagulated by the addition of aluminum potassium sulfate, filtered, rinsed with water, methanol and ether, and dried to constant weight at 50° C. and 20 mm. pressure over phosphorus pentoxide. Copolymer was obtained in 86% conversion, inherent viscosity 0.88 at 0.5% concentration in chloroform at 25° C.

A film was cast from a 20% solution of the copolymer of Example 22 in chloroform using a 10 mil knife.

EXAMPLE 23

A clean, nitrogen-swept, screw-capped glass tube was charged with 0.35 ml. of 3-ethyl-1-cyanocyclobutene, 2.12 ml. of acrylonitrile, 7.0 ml. of oxygen-free deionized water, 1.25 ml. of potassium persulfate solution, 0.5 ml. of sulfuric acid-ferrous ion solution and 1.2 ml. of sodium metabisulfite solution. The tube was capped and rotated in a 50° C. water bath for 0.5 hr., cooled, and the contents filtered, washed with water and methanol and air dried. The copolymer was obtained in 75% conversion incorporating 22% of 3-ethyl-1-canocyclobutene, inherent viscosity 1.39 at 0.1% concentration in dimethylformamide at 25° C.

A film was cast from a 20% solution of the copolymer in dimethylformamide using a 10 mil knife, dried overnight at 75° C. and extracted with warm water. Cut strips of the film were drawn 4× and 8× over a heated roll at 140° and 175° C. respectively, followed by boiling off.

|  | 90° C. wet properties | |
|---|---|---|
|  | 4X | 8X |
| Tenacity (g./d.) | 0.23 | 0.42 |
| Elongation at break (percent) | 36.8 | 18.2 |
| Initial modulus (g./d.) | 2.5 | 3.4 |

EXAMPLE 24

A clean, nitrogen-swept, screw-capped glass tube was charged with 0.60 ml. of 3-ethyl-1-cyanocyclobutene, 1.75 ml. of acrylonitrile, 7.0 ml. of oxygen-free deionized water, 1.25 ml. of potassium persulfate solution, 0.50 ml. of sulfuric acid-ferrous ion solution and 1.2 ml. of sodium metabisulfite solution. The tube was capped and rotated in a 50° C. water bath for 1 hr., cooled, and the contents filtered, washed with water and methanol and air dried. Copolymer was obtained in 47.5% conversion containing 23.1% of 3-ethyl-1-cyanocyclobutene, inherent viscosity 1.12 at 0.1% concentration in dimethylformamide at 25° C.

A film was cast from a 19% solution of the copolymer in dimethylformamide using a 10 mil knife, dried overnight at 75° C. and extracted with warm water. Cut strips of the film were drawn 4× and 8× over a heated roll at 140° and 180° C. respectively, followed by boiling off.

|  | 90° C. wet properties | |
|---|---|---|
|  | 4X | 8X |
| Tenacity (g./d.) | 0.10 | 0.22 |
| Elongation at break (percent) | 21.5 | 22.2 |
| Initial modulus (g./d) | 1.7 | 1.83 |

EXAMPLE 25

A clean, nitrogen-swept, screw-capped glass tube was charged with 0.35 ml. of 3-pentyl-1-cyanocyclobutene, 2.12 ml. of acrylonitrile, 1.25 ml. of potassium persulfate solution, 0.50 ml. of sulfuric acid-ferrous ion solution, and 1.2 ml. of sodium metabisulfite solution. The tube was capped and rotated in a 50° C. water bath for 0.5 hr., cooled, and the contents filtered, washed with water and methanol and air dried. Copolymer was obtained in 80% conversion incorporating 3.12% of 3-pentyl-1-cyanocyclobutene, inherent viscosity 1.40 at 0.1% concentration in dimethylformamide at 25° C.

A film was cast from a 20% solution of the copolymer in dimethylformamide using a 10 mil knife, dried overnight at 75° C. and extracted with warm water. Cut strips of the film were drawn 4× and 8× over a heated roll at 165° and 180° C. respectively, followed by boiling off.

|  | 90° C. wet properties | |
|---|---|---|
|  | 4X | 8X |
| Tenacity (g./d.) | 0.18 | 0.63 |
| Elongation at break (percent) | 37.2 | 14.5 |
| Initial modulus (g./d.) | 2.8 | 4.9 |

EXAMPLE 26

A clean, nitrogen-swept, screw-capped glass tube was charged with 0.60 ml. of 3-pentyl-1-cyanocyclobutene, 1.75 ml. of acrylonitrile, 7.0 ml. of oxygen-free deionized water, 1.25 ml. of potassium persulfate solution, 0.50 ml. of sulfuric acid-ferrous ion solution, and 1.2 ml. of sodium metabisulfite solution. The tube was capped and rotated in a 50° C. water bath for 1 hr., cooled, and the contents filtered, washed with water and methanol and air dried. Copolymer was obtained in 70% conversion incorporating 25.4% of 3-pentyl-1-cyanocyclobutene, inherent viscosity 1.13 at 0.1% concentration in dimethylformamide at 25° C.

A film was cast from a 20% solution of the copolymer in dimethylformamide using a 10 mil knife, dried overnight at 75° C. and extracted with warm water. Cut strips of the film were drawn 4× and 8× over a heated roll at 170° and 180° C. respectively, followed by boiling off.

|  | 90° C. wet properties | |
|---|---|---|
|  | 4X | 8X |
| Tenacity (g./d.) | 0.25 | 0.45 |
| Elongation at break (percent) | 45.6 | 15.2 |
| Initial modulus (g./d.) | 2.8 | 3.8 |

EXAMPLE 27

A clean, nitrogen-swept, screw-capped glass tube was charged with 0.15 g. of 3-bromo-1-cyanocyclobutene, 1.06 ml. (0.85 g.) of acrylonitrile, 3.5 ml. of oxygen-free deionized water, 0.63 ml. of potassium persulfate solution, 0.25 ml. of sulfuric acid-ferrous ion solution and 0.6 ml. of sodium metabisulfite solution. The tube was capped and rotated in a 50° C. water bath for 1 hour. Copolymer was obtained in 99% conversion incorporating 10.9% of 3-bromo-1-cyanocyclobutene, inherent viscosity 1.11 at 0.1% concentration in dimethylformamide at 25° C.

A film was case from a 19% solution of the copolymer in dimethylformamide using a 10 mil knife, dried at 75° C. overnight and extracted with warm water. Cut strips of the film were drawn 4× and 8× over a heated roll at 130° and 165° C., respectively, followed by boiling off.

|  | 90° C. wet properties | |
|---|---|---|
|  | 4X | 8X |
| Tenacity (g./d.) | 0.26 | 0.59 |
| Elongation at break (percent) | 50.3 | 23.8 |
| Initial modulus (g./d.) | 3.9 | 4.5 |

EXAMPLE 28

A clean, nitrogen-swept, screw-capped glass tube was charged with 0.15 g. of 3-(3-cyanocyclobutyl)-1-cyanocyclobutene, 1.06 ml. of acrylonitrile, 3.5 ml. of oxygen-free deionized water, 0.63 ml. of potassium persulfate solution, 0.25 ml. of sulfuric acid-ferrous ion solution and 0.6 ml. of sodium metabisulfite solution. The tube was capped and rotated in a 50° C. water bath for 1 hr., cooled, and the contents filtered, washed with water and methanol and air dried. Copolymer was obtained in 85% conversion incorporating 26.1% of 3-(3-cyanocyclobutyl)-1-cyanocylobutene, inherent viscosity 1.35 at 0.1% concentration in dimethylformamide at 25° C.

A film was cast from a 15% solution of the copolymer in dimethylformamide using a 10 mil knife, dried at 75° C. and extracted with warm water. Cut strips of the film were drawn 4× and 8× over a heated roll at 130° and 180° C. respectively, followed by boiling off.

|  | 90° C. wet properties | |
|---|---|---|
|  | 4X | 8X |
| Tenacity (g./d.) | 0.12 | 0.35 |
| Elongation at break (percent) | 47.8 | 34.6 |
| Initial modulus (g./d.) | 0.7 | 1.3 |

EXAMPLE 29

A clean, nitrogen-swept, screw-capped glass tube was charged with 0.30 ml. of 3,3-dimethyl-1-cyanocyclobutene, 2.0 ml. of acrylonitrile, 7.0 ml. of oxygen-free deionized water, 1.25 ml. of potassium persulfate solution, 0.50 ml. of sulfuric acid-ferrous ion solution and 1.20 ml. of sodium metabisulfite solution. The tube was capped and rotated in a 50° C. water bath for 1 hr., cooled, and the contents filtered, washed with water and methanol and air dried. Copolymer was obtained in 82.5% conversion incorporating 11.1% of 3,3-dimethyl-1-cyanocyclobutene, inherent viscosity 1.26 at 0.1% concentration in dimethylformamide at 25° C.

A film was cast from a 20% solution of the copolymer in dimethylformamide using a 10 mil knife, dried at 75° C. overnight and extracted with warm water. Cut strips of the film were drawn 4× and 8× over a heated roll at 115° and 130° C., respectively, followed by boiling off.

|  | 90° C. wet properties | |
|---|---|---|
|  | 4X | 8X |
| Tenacity (g./d.) | 0.17 | 0.68 |
| Elongation at break (percent) | 66.9 | 29.6 |
| Initial modulus (g./d.) | 2.69 | 4.99 |

EXAMPLE 30

A clean, nitrogen-swept, screw-capped glass tube was charged with 1.0 ml. of 3,3-dimethyl-1-cyanocyclobutene, 1.25 ml. of acrylonitrile, 7.0 ml. of oxygen-free deionized water, 1.25 ml. of potassium persulfate solution, 0.50 ml. of sulfuric acid-ferrous ion solution and 1.2 ml. of sodium metabisulfite solution. The tube was capped and rotated in a 50° C. bath for 2 hr., cooled, and the contents filtered, washed with water and methanol and air dried. Copolymer was obtained in 44.5% conversion incorporating 4.88% of 3,3-dimethyl-1-cyanocyclobutene, inherent viscosity 0.92 at 0.1% concentration in dimethylformamide at 25° C.

EXAMPLE 31

A clean, nitrogen-swept, screw-capped glass tube was charged with 0.40 ml. of 3-bromo-3-methyl-1-cyanocyclobutene, 2.12 ml. of acrylonitrile, 7.0 ml. of oxygen-free deionized water, 1.25 ml. of potassium persulfate solution, 0.50 ml. of sulfuric acid-ferrous ion solution and 1.20 ml. of sodium metabisulfite solution. The tube was capped and rotated in a 50° C. water bath for 1.5 hr., cooled, and the contents filtered, washed with water and methanol and air dried. Copolymer was obtained in 62% conversion containing 0.86% of 3-bromo-3-methyl-1-cyanocyclobutene, inherent viscosity 1.52 at 0.10% concentration in dimethylformamide at 25° C.

A film was cast from a 20% solution of the copolymer in dimethylformamide using a 10 mil knife, dried at 75° C. for 2 hr. and extracted with warm water. Cut strips of the film were drawn 4× and 8× over a heated roll at 105° and 160° C. respectively, followed by boiling off.

|  | 90° C. wet properties | |
|---|---|---|
|  | 4X | 8X |
| Tenacity (g./d.) | 0.27 | 0.84 |
| Elongation at break (percent) | 136.9 | 32.1 |
| Initial modulus (g./d.) | 3.2 | 6.3 |

EXAMPLE 32

A clean, nitrogen-swept, screw-capped glass tube was charged with 0.60 ml. of 3-bromo-3-methyl-1-cyanocyclobutene, 1.75 ml. of acrylonitrile, 7.0 ml. of oxygen-free distilled water, 1.25 ml. of potassium persulfate solution, 0.50 ml. of sulfuric acid-ferrous ion solution and 1.2 mi. of sodium metabisulfite solution. The tube was capped and rotated in a 50° C. water bath for 1.5 hrs., cooled, and the contents filtered, washed with water and methanol and air dried. Copolymer was obtained in 24.5% conversion incorporating 3.82% of 3-bromo-3-methyl-1-cyanocyclobutene, inherent viscosity 0.90 at 0.1% concentration in dimethylformamide at 25° C.

EXAMPLE 33

An acid-washed bottle was charged with 1.2 g. of methyl 3,3-dimethylcyclobutene-1-carboxylate, 6.8 g. of acrylonitrile, 28 ml. of oxygen-free distilled water, 0.4 ml. of sodium lauryl sulfate solution, 2.0 ml. of sulfuric acid-ferrous ion solution 2.4 ml. of sodium metabisulfite solution and 5.0 ml. of potassium persulfate solution. The charged bottle was capped and rotated at 50° C. for four hours. The emulsion was precipitated with steam and saturated sodium sulfate solution. The polymer was isolated by filtration, washed with hot water, methanol and ether, and then dried overnight in a vacuum oven at 40–45° C. over $P_2O_5$ to afford 7.38 g. (92% yield) of copolymer. The copolymer had an inherent viscosity of 1.64 at 0.1% concentration in dimethylformamide at 25° C. Infrared absorption at 1724 and 1220 cm.$^{-1}$ confirmed the presence of the ester functionality. Elemental analysis indicated that the copolymer contained 6.82% of the ester.

EXAMPLE 34

A glass tube was charged with 19.60 g. of methyl methacrylate, 0.40 g. of 1-cyanocyclobutene, 0.02 g. of azobisisobutyronitrile, and 0.028 g. of lauryl mercaptan. The tube was cooled, evacuated, sealed under vacuum and heated at 60° C. for 17 hours. The tube was then heated for 2 hours at 110° C. The tube was opened, and the clear copolymer was dissolved in chloroform and precipitated from methanol. After drying, the coyolymer had an inherent viscosity of 1.092 at 0.5% concentration in chloroform at 20° C. By differential thermal analysis, using a chip molded under heat and pressure, the copolymer exhibited a glass transition temperature of 116.6° C. A cast film of the copolymer exhibited a peak at 2330 cm.$^{-1}$ in the infrared that confirmed the presence of the cyano, (C≡N), group.

*Analysis.*—Calcd. for 2% cyanocyclobutene in the copolymer (percent): N, 0.36. Found (percent): N, 0.43.

EXAMPLE 35

A glass tube was charged with 19.0 g. of methyl methacrylate, 1.0 g. of 1-cyanocyclobutene, 0.02 g. of azobisisobutyronitrile, and 0.028 g. of lauryl mercaptan. The tube was cooled, evacuated, sealed under vacuum and heated at 60° C. for 17 hours. The tube was then heated for 2 hours at 110° C. The tube was opened, and the resulting copolymer was dissolved in chloroform and precipitated from methanol. After drying, the copolymer had an inherent viscosity of 1.180 at 0.5% concentration in chloroform at 20° C. By differential thermal analysis, the copolymer exhibited a glass transition temperature of 125.8° C. A cast film of the copolymer exhibited a peak at 2230 cm.$^{-1}$ in the infrared that confirmed the presence of the cyano, (C≡N), group.

*Analysis.*—Calcd. for 5.0% cyanocyclobutene in the copolymer (percent): N, 0.88. Found (percent): N, 0.89.

EXAMPLE 36

A glass tube was charged with 18.0 g. of methyl methacrylate, 2.0 g. of 1-cyanocyclobutene, 0.02 g. of azobisisobutyronitrile, and 0.028 g. of lauryl mercaptan. The tube was cooled, evacuated, sealed under vacuum and heated at 60° C. for 17 hours. The tube was then heated for 2 hours at 110° C. The tube was opened, and the resulting copolymerw as dissolved in chloroform and precipitated from methanol. After drying, the copolymer had an inherent viscosity of 1.199 at 0.5% concentration in chloroform at 20° C. By differential thermal analysis, the copolymer exhibited a glass transition temperature of 125.6° C. A cast film of the copolymer exhibited a peak at 2230 cm.$^{-1}$ in the infrared that confirmed the presence of the cyano, (C≡N), group.

*Analysis.*—Calcd. for 10% cyanocyclobutene in the copolymer (percent): N, 1.77. Found (percent): N, 0.91.

Under conditions of the polymerization it was apparent that only 5.0 wt. percent of 1-cyanocyclobutene had been incorporated into the copolymer as indicated by both the nitrogen content and physical properties of the product.

EXAMPLE 37

A glass tube was charged with 19.60 g. of methyl methacrylate, 0.40 g. of 1-carbomethoxycyclobutene, 0.02 g. of azobisisobutyronitrile, and 0.028 g. of lauryl mercaptan. The tube was cooled, evacuated, sealed under vacuum and heated at 60° C. for 17 hours. The tube was then heated for 2 hours at 110° C. The tube was opened and the clear polymer was dissolved in chloroform and precipitated from emthanol. After drying, the copolymer had an inherent viscosity of 0.982 at 0.5% concentration in chloroform at 20° C. By differential thermal analysis, the copolymer exhibited a glass transition temperature of 117.5° C.

EXAMPLE 38

A glass tube was charged with 19.0 g. of methyl methacrylate, 1.0 g. of 1-carbomethoxycyclobutene, 0.02 g. of azobisisobutyronitrile, and 0.028 g. of lauryl mercaptan. The tube was cooled, evacuated, sealed under vacuum and heated at 60° C. for 17 hours. The tube was then heated for 2 hours at 110° C. The tube was opened and the clear copolymer was dissolved in chloroform and precipitated from methanol. After drying, the copolymer had an inherent viscosity of 0.979 at 0.5% concentration in chloroform at 20° C. By differential thermal analysis, the copolymer exhibited a glass transition temperature of 120.9° C.

EXAMPLE 39

A glass tube was charged with 18.0 g. of methyl methacrylate, 2.0 g. of 1-carbomethoxycyclobutene, 0.02 g. of azobisisobutyronitrile, and 0.028 g. of lauryl mercaptan. The tube was cooled, evacuated, sealed under vacuum and heated at 60° C. for 17 hours. The tube was then heated for 2 hours at 110° C. The tube was opened, and the clear copolymer was dissolved in chloroform and precipitated from methanol. After drying, the copolymer had an inherent viscosity of 0.994 at 0.5% concentration in chloroform at 20° C. By differential thermal analysis, the copolymer exhibited a glass transition temperature of 122.7° C.

EXAMPLE 40

A mixture of 122.5 g. of methyl methacrylate, 2.50 g. of 3,3-dimethyl-1-cyclobutenecarboxamide 0.39 g. of lauryl mercaptan, 0.050 g. of an ultraviolet light stabilizer, 10.7 g. of a 3% aqueous solution of polymethacrylic acid, 8.7 g. of disodium phosphate and 500 ml. of water was stirred vigorously, in an inert atmosphere and heated to 81° C. while at 10 minute intervals 0.75 ml. portions of a solution of 1.5 g. of azobisisobutyronitrile in 50 ml. of methanol were added for a total of 5 additions after an initial addition of 8.5 ml. After all additions were complete a 12 ml. portion was added, at which time an exothermic reaction took place and granules of the solid copolymer were formed. The reaction was then heated to reflux and held at this temperature for 30 minutes. The reaction was cooled to 70° C., filtered, washed with water and dried to obtain 105.0 g. of copolymer. The copolymer had an inherent viscosity of 0.410 at 0.5% concentration in chloroform at 20° C. By differential thermal analysis, the copolymer exhibited a glass transition temperature of 109.3° C.

*Analysis.*—Calcd. for 2% 3,3-dimethyl-1-cyclobutenecarboxamide in the copolymer. Found (percent: N, 0.22, N, 0.17, 0.19.

(III) PREPARATION OF 2-ALKOXY-1-CYANOCYCLOBUTENES

EXAMPLE 41

Preparation of 2-methoxy-1-cyanocyclobutene

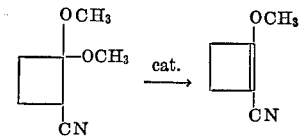

A 13.3 g. sample of 2,2-dimethoxy-1-cyanocyclobutane was heated in the pot of a spinning-band column with about 1 g. of anhydrous p-toluenesulfonic acid under vacuum (0.5 mm.). In about 8 hours, two fractions (one at 40° C. and the other at 70–100° C.) and non-condensed material were collected in two traps cooled, in turn, by ice and Dry Ice. The low-boiling fraction and condensates were combined and redistilled to give 4.5 g. (44%) of 2-methoxy-1-cyanocyclobutene (>99% pure, B.P. 32–40° C. at 0.3 mm.). The n.m.r. spectrum (CDCl$_3$) showed —OCH$_3$ absorption at τ6.00 and an A$_2$B$_2$ pattern from the ring methylenes centered at τ7.5. The infrared spectrum showed a —CN band at 2225 cm.$^{-1}$ and enol-ether double bond at 1645 cm.$^{-1}$. The ultraviolet spectrum showed

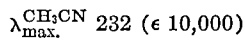

$\lambda_{max.}^{CH_3CN}$ 232 ($\epsilon$ 10,000)

The mass spectrum showed a base peak for the parent at m/e 109.

*Analysis.*—Calcd. for C$_6$H$_7$NO (109.13) (percent): C, 66.03; H, 6.46; N, 12.84. Found (percent): C, 65.33; H, 6.62; N, 12.60.

The following table shows, in column 2, the products obtained when the procedure of Example 41 is effected using the cyanocyclobutane of column 1:

TABLE I

| Cyanocyclobutane | Products |
| --- | --- |
| 2,2-dioctyloxy-1-cyanocyclobutane | 2-octyloxy-1-cyanocyclobutene. |
| 2,2-diphenoxy-1-cycanocyclobutane | 2-phenoxy-1-cyanocyclobutene. |
| 2,2-diamyloxy-1-cyanocyclobutane | 2-amyloxy-1-cyanocyclobutene. |
| 2,2-diethoxy-1-cyanocyclobutane | 2-ethoxy-1-cyanocyclobutene. |
| 2,2-diethoxy-3-methyl-1-cyanocyclobutane. | 2-ethoxy-3-methyl-1-cyanocyclobutene. |
| 2,2-diethoxy-3,3-dimethyl-1-cyanocyclobutane. | 2-ethoxy-3,3-dimethyl-1-cyanocylobutene. |
| 2,2-dimethoxy-3-benzyl-1-cyanocyclobutane. | 2-methoxy-3-benzyl-1-cyanocyclobutene. |
| 2,2-dimethoxy-3-$\beta$-phenethyl-1-cyanocyclobutane. | 2-methoxy-3-$\beta$-phenethyl-1-cyanocyclobutene. |
| 2,2-dimethoxy-3-$\gamma$-phenylpropyl-1-cyanocyclobutane. | 2-methoxy-3-$\gamma$-phenylpropyl-1-cyanocyclobutene. |
| 2,2-dimethoxy-3-heptyl-1-cyanocyclobutane. | 2-methoxy-3-heptyl-1-cyanocyclobutene |
| 2,2-dimethoxy-3-hexadecyl-1-cyanocyclobutane. | 2-methoxy-3-hexadecyl-1-cyanocyclobutene. |
| 2,2-diethoxy-3-chloro-1-cyanocyclobutane. | 2-ethoxy-3-chloro-1-cyanocyclobutene. |
| 2,2-diethoxy-3,3-dichloro-1-cyanocyclobutane. | 2-ethoxy-3,3-dichloro-1-cyanocyclobutene. |
| 2,2-diethoxy-3-bromo-1-cyanocyclobutane. | 2-ethoxy-3-bromo-1-cyanocyclobutene. |
| 2,2-diethoxy-3,3-dibromo-1-cyanocyclobutane. | 2-ethoxy-3,3-dibromo-1-cyanocyclobutene. |
| 2,2-diethoxy-4,4-dichloro-1-cyanocyclobutane. | 2-ethoxy-4,4-dichloro-1-cyanocyclobutene. |
| 2,2-diethoxy-3-phenyl-1-cyanocyclobutane. | 2-ethoxy-3-phenyl-1-cyanocyclobutene. |
| 2,2-diethoxy-1-dimethyl-carbamylcyclobutane. | 2-ethoxy-1-dimethylcarbamyl-cyclobutene. |
| Ethyl 2,2-diethoxy-1-cyclobutane carboxylate. | Ethyl 2-ethoxy-1-cyclobutene carboxylate. |
| 2,2-diethoxycyclobutane carboxamide. | 2-ethoxycyclobutane carboxamide. |

EXAMPLE 42

Preparation of 2-methoxy-1-cyanocyclobutene 2-methoxy-1-cyanocyclobutene was also prepared from 2,2-dimethoxy-1-cyanocyclobutane, employing (a) methanesulfonic acid and (b) P$_2$O$_5$ catalyst.

(a) A 48 g. sample of the cyanoketal with 2.5 g. of methanesulfonic acid was heated under vacuum (0.8 mm.) in the pot of a spinning-band still. Two fractions yielding 18.89 g. were taken at a temperature range of 38° C.–50° C. over 12 hours. Then 2.5 g. of additional methanesulfonic acid was added. The slow distillation was continued for 8 hours, with a third cut of 15.18 g. about one-half of which boiled at 40° C. and the remainder boiling at a higher temperature was collected. Three traps, the first two cooled successively with ice-methanol and the third with Dry Ice contained 3.25 g., 2.06 g., and 9.04 g., respectively. The total material recovered (48.42 g.) represented 91.5% of that charged. Redistillation of combined cuts 1 and 2 and condensate of traps 1 and 2 gave 29 g. (78%) of 2-methoxy-1-cyanocyclobutene (B.P. 32–37° C. at 0.3–0.2 mm.) containing about 10% methyl methanesulfonate impurity. A 2.5 g. portion of methanesulfonic acid was added to the still pot and a final fraction of 8.0 g. was collected at a temperature of 40–60° C. and a pressure of 0.2 mm. and by infrared analysis (1740 cm.$^{-1}$ band) shown to be a 1:1 mixture of 2-methoxy-1-cyanocyclobutene and ring-opened by-product. The yield by this procedure is about 75%.

(b) A mixture of 58 g. of 2,2-dimethoxy-1-cyanocyclobutane and 58 g. of phosphorus pentoxide were heated under full vacuum (about 0.3 mm.) in a short path still. The volatiles were distilled through a spinning-band column to give 17.8 g. (40%) of 2-methoxy-1-cyanocyclobutene and 13.1 g. (22%) of recovered starting material.

EXAMPLE 43

Preparation of 2-methoxy-1-cyanocyclobutene

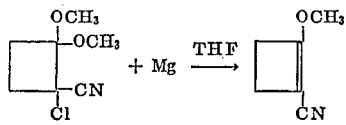

A mixture of 0.88 g. of 1-cyano-1-chloro-2,2-dimethoxycyclobutane, 121 mg. of magnesium turnings, and 30 ml. of dry tetrahydrofuran (THF) were stirred under nitrogen at room temperature. The reaction was initiated by addition of "live" Mg, prepared from BrCH$_2$CH$_2$Br+Mg+THF in a test tube. After refluxing for 20 hours, most of the starting material had disappeared. The volatiles were distilled under vacuum. About 0.18 g. (33%) of 2-methoxy-1-cyanocyclobutene was obtained.

EXAMPLE 44

Preparation of 2,2-dimethoxy-1-chloro-1-cyanocyclobutane

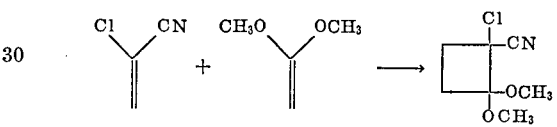

An 8.8 g. sample of ketene dimethylacetal, 8.8 g. of 2-chloroacrylonitrile, 100 mg. of phenothiazine and 25 ml. of benzene were heated in an autoclave for 16 hours at 150° C. The recovered material (35 g., 87.5% recovery) was distilled through a spinning-band column giving 6.6 g. (43% conversion) of the 2,2-dimethoxy-1-cyanocyclobutane, with boiling point of 51° C. at 0.4 mm. pressure. The nmr spectrum (CDCl$_3$) showed two OCH$_3$ singlets at $\tau$ 6.67 and $\tau$ 6.68, and a multiplet at $\tau$ 7.6 for the ring protons. The infrared spectrum showed bands at 2225 cm.$^{-1}$ (C≡N) and multiplet at 1000 cm.$^{-1}$ region for

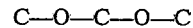

The mass spectrum showed abundant ions at m/e 146, 144 (P—OCH$_3$) and 88 (CH$_2$=C(OCH$_3$)$_2$)+.

*Analysis.*—Calcd. for C$_7$H$_{10}$OClNO$_2$ (176.61) (percent): C, 47.88; H, 5.74; N, 7.98; Cl, 20.19. Found (percent): C, 48.20; H, 5.97; N, 7.50; Cl, 19.88.

EXAMPLE 45

Preparation of 2,2-dimethoxy-1-chloro-1-cyanocyclobutane

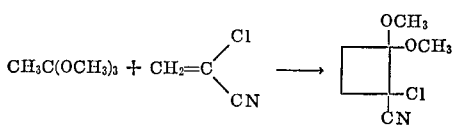

A 12.0 g. sample of methyl orthoacetate, 20 g. of 2-chloacrylonitrile and 0.1 g. of phenothiazine were sealed in a Carius tube and heated in a steam bath for 2.5 days. The tube was opened and vented and the contents distilled through a spinning-band column. The 0.5 g. fraction boiling at 47–53° C. at a pressure of 0.3 mm., was essentially pure 2,2-dimethoxy-1-chloro-1-cyanocyclobutane.

Other 2-hydrocarbyloxy-1-cyanocyclobutenes having, if desired, other substitutents may be made by following the general procedures of Examples 45 and 43 or 41. When these procedures are applied to the ortho esters of Column 1 and the acrylic compound of Column 2, the cyclobutenes of Column 3 are obtained.

TABLE II

| Ortho esters | Acrylic compounds | Cyclobutenes |
|---|---|---|
| Ethyl orthoacetate | 3-chloroacrylonitrile | 2-ethoxy-4-chloro-1-cyanocyclobutene. |
| Phenyl orthoacetate | Ethyl acrylate | Ethyl 2-phenoxy-1-cyanocyclobutene carboxylate. |
| Benzyl orthoacetate | Acrylonitrile | 2-benzyloxy-1-cyanocyclobutene. |
| β-Phenethyl orthoacetate | do | 2-β-phenethoxy-1-cyanocyclobutene. |
| m-Tolyl orthoacetate | 2-chloroacrylonitrile | 2-m-tolyloxy-1-cyanocyclobutene. |
| Methyl orthochloroacetate | Acrylonitrile | 2-methoxy-3-chloro-1-cyanocyclobutene. |
| Methyl orthobromoacetate | do | 2-methoxy-3-bromo-1-cyanocyclobutene. |
| Ethyl orthodibromoacetate | do | 2-ethoxy-3,3-dibromo-1-cyanocyclobutene. |
| Ethyl ortho-2-bromopropionate | do | 2-ethoxy-3-bromo-3-methyl-1-cyanocyclobutene. |
| Methyl orthopropionate | 2-chloroacrylonitrile | 2-methoxy 3-methyl-1-cyanocyclobutene.- |
| Methyl orthoisobutyrate | Crotononitrile | 2-methoxy-3,3,4-trimethyl-1-cyanocyclobutene. |
| Ethyl orthobutyrate | Acrylonitrile | 2-ethoxy-3-ethyl-1-cyanocyclobutene. |
| Ethyl orthohexanoate | do | 2-ethoxy-3-butyl-1-cyanocyclobutene. |
| Ethyl orthooctanoate | do | 2-ethoxy-3-hexyl-1-cyanocyclobutene. |
| Methyl orthophenylacetate | do | 2-methoxy-3-phenyl-1-cyanocyclobutene. |
| Methyl ortho-β-phenyl propionate | do | 2-methoxy-3-benzyl-1-cyanocyclobutene. |
| Methyl ortho-γ-phenyl butyrate | do | 2-methoxy-3-π-phenethyl-1-cyanocyclobutene. |
| Ethyl ortholaurate | do | 2-ethoxy-3-decyl-1-cyanocyclobutene. |
| Ethyl orthostearate | do | 2-ethoxy-3-hexadecyl-1-cyanocyclobutene. |
| Ethyl orthochloroacetate | 2-chloroacrylonitrile | 2-ethoxy-3-chloro-1-cyanocyclobutene. |
| Ethyl orthodichloroacetate | do | 2-ethoxy-3,3-dichloro-1-cyanocyclobutene. |
| Ethyl orthoacetate | 3,3-dichloroacrylonitrile | 2-ethoxy-4,4-dichloro-1-cyanocyclobutene. |
| Methyl orthoacetate | 2-fluoroacrylonitrile | 2-methoxy-1-cyanocyclobutene. |

EXAMPLE 46

2,2-dimethoxy-1-cyanocyclobutane

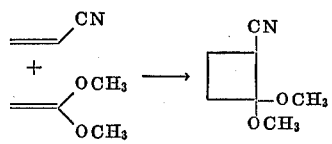

Four Carius tubes were each loaded with 0.4 g. of phenothiazine, 37.5 ml. of acrylonitrile, and 25 ml. of ketene dimethylacetal. The tubes were heated to 150° C. for 24 hours. The contents of the tubes were combined and distilled into a Dry Ice-acetone cooled trap at full vacuum using a heat gun. The voltatiles were distilled through a 15″ spinning-band column to give 58 g. of product, B.P. 68° C./2.5 mm. The liquid could be induced to crystallize by scratching. The solid had a melting point of 31–32° C., the infrared spectrum showed the following bands 3.50, 4.45, 8–10μ. A sample prepared in a similar manner was analyzed.

Analysis.—Calcd. for $C_7H_{11}O_2N$ (percent): C, 59.55; H, 7.85; N, 9.92. Found (percent): C,59.63; H, 7.72; N, 10.31.

(IV) COPOLYMERS OF 2-METHOXY-1-CYANOCYCLOBUTENES

EXAMPLE 47

Polymerization of 2-methoxy-1-cyanocyclobutene

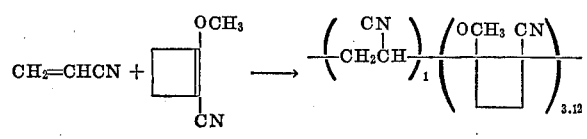

A 1.6-g. sample (0.03 mole) of polymer grade acrylonitrile, 0.82 g. (0.0075 mole) of 2-methoxy-1-cyanocyclobutene, 20 mg. of azobisisobutyronitrile (0.00015 mole) and 15 ml. of dry dimethyl sulfoxide were stirred at 60° C. overnight under nitrogen. The reaction mixture was poured into a blender containing methanol and 0.8 g. of the elastomeric polymer obtained was dried in a vacuum oven. Combustion analysis for nitrogen (N, 14.60; 14.87) suggested an approximate composition of 3.12 units of methoxycyanocyclobutene for each unit of acrylonitrile in the copolymer; inherent viscosity (0.1% in dimethylformamide at 25° C.) equals 0.10.

EXAMPLE 48

Polymerization of 2-methoxy-1-cyanocyclobutene

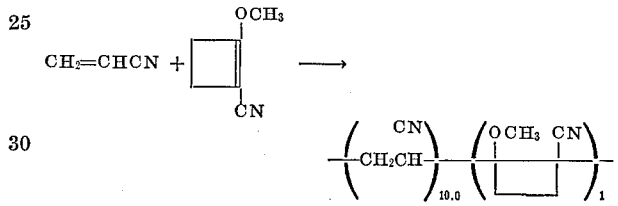

About 100 mg. of crude 2-methoxy-1-cyanocyclobutene (prepared as in Example 43) and a crystal of azobisisobutyronitrile were irradiated with "black light" for 22.5 hours, when two parts (by volume) of acrylonitrile was added and irradiation continued. Within one-half hour, a fair amount of copolymer had formed. After 3 days, the then solid mass gave a viscous dope with dimethylformamide, characteristic of a high polymer. The procedure was repeated with a pure sample of 2-methoxy-1-cyanocyclobutene, prepared as in Example 46 and the viscous dope thus obtained was precipitated by pouring into THF; the solid polymer thus obtained was dried at 80° C. for 4 days under vacuum for combustion analysis: N, 24.19, 24.44. The percent N found suggested that approximately 10.9 molecules of acrylonitrile had combined with each unit of 2-methoxy-1-cyanocyclobutene in the copolymer.

EXAMPLE 49

Polymerization of 2-methoxy-1-cyanocyclobutene

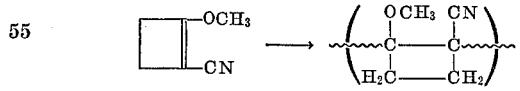

To a 3.3 g. sample of 2-methoxy-1-cyanocyclobutene dissolved in 60 ml. of dry THF was added 250 μl. of 1.6M n-butyl lithium at 0° C. After about 3 hours of stirring at 0° C., the mixture was stirred at room temperature overnight. No signs of reaction occurred, so an addiitonal 250 μl. portion of 1.6 M n-butyl lithium was added at 0° C. The reaction mixture was stirred at 0° C. for 5 hours and at room temperature for 2.5 days, then poured onto an equal volume of water. A thermoplastic homopolymer was isolated by filtration.

EXAMPLE 50

A 50/50 (by weight) copolymer of 1-cyanocyclobutene and acrylonitrile was made by emulsion polymerization using the procedure of Example 7. The product had an inherent viscosity of 1.47 (0.1% in OMF at 25° C.). A spinning dope was prepared from 30 g. of the copolymer in 100 ml. of distilled dimethylformamide. This 30% solids dope was dry-spun through a 5-hole spinneret. Head temperature was 65–75° C., pressure was 100–110 p.s.i., and the spinneret temperature was 105° C. The hot nitrogen counterflow was 140–143° C. The resulting filaments had a round cross-section. After a water soaking, the plied filaments were drawn 4.5× under 5 p.s.i. steam pressure. The fibers were boiled off in water for one hour and had 22% shrinkage. Tenacity, elongation to break, and initial modulus data were obtained at room temperature and 65% relative humidity and at 90° C. immersed in water on individual filaments. Average values are shown below:

| | T(grams/ denier) | E (percent) | Mi (grams denier) |
|---|---|---|---|
| 25° C. 65% R.H. | 1.12 | 37.4 | 31.7 |
| 90° C. 100% R.H. | 0.46 | 82.6 | 13.5 |

EXAMPLE 51

Monomer grade styrene (1.74 g., 1.58 g., 1.23 g., and 0.54 g.) was transferred into four previously constricted polymer tubes. Freshly distilled 1-cyanocyclobutene (0.61 g., 1.45 g., 0.97 g., and 1.52 g.) was then syringed into the same four tubes in the same order. To each tube was added 8 ml. of a 100 ml. γ-butyrolactone solution containing 100 mg. of azobisisobutyronitrile. Each tube was degassed by freezing and thawing under vacuum and the tubes were sealed under vacuum. All four tubes were tumbled end over end in a 50° C. water bath for 3.5 hours. The initially formed polymers were recovered by blending the respective solutions into a large excess of methanol in a high speed blender and filtering the resulting precipitates. Each copolymer was redissolved in an appropriate solvent (hot toluene, hot acetone, or tetrahydrofuran) for it and reprecipitated in methanol. The crude polymers were dried for 1.5 days at 80° C. under 1 mm. Hg vacuum to give 0.04, 0.03, 0.04, 0.05 g. of product from each of the four tubes, respectively. The analyses are shown below:

| Sample Number: | Percent C | Percent H | Percent $N_{dumas}$ | 1-cyano- cyclo- butene in copoly- mer |
|---|---|---|---|---|
| 1 | 85.48 / 86.26 | 7.35 / 7.13 | 5.35 / 5.41 | 30.4 |
| 2 | (1) / (1) | (1) / (1) | 7.16 / 6.96 | 39.9 |
| 3 | 84.34 / 84.21 | 7.40 / 7.20 | 7.10 / 7.24 | 40.5 |
| 4 | 80.62 / 80.90 | 7.00 / 7.13 | 9.53 / 9.42 | 53.5 |

1 Percent by weight, based on N analysis.
2 Insufficient sample.

When the bicyclo(1.1.0)butanes shown in Table III below are substituted for 1-cyanobicyclo(1.1.0)butane in the procedure of Example 14 the corresponding cyanocyclobutene/bicyclobutane/acrylonitrile terpolymers are obtained.

TABLE III bicyclo(1.1.0)butane
1-hydroxymethylbicyclo(1.1.0)butane
1,3-bis(trifluoromethyl)-2,2,4,4-tetrafluorobicyclo (1.1.0)butane
2,4-bis(methoxycarbonyl)bicyclo(1.1.0)butane
2,4-bis(ethoxycarbonyl)-1-methyl-3-phenylbicyclo (1.1.0)butane
1,3-dimethylbicyclo(1.1.0)butane
1-methoxycarbonylbicyclo(1.1.0)butane
1-ethoxycarbonylbicyclo(1.1.0)butane
1-carboxybicyclo(1.1.0)butane
2-carboxy-1,3-diphenylbicyclo(1.1.0)butane
1-propionyloxy-2,2,4,4-tetramethylbicyclo (1.1.0)butane
1-carbamoyl-3-methylbicyclo(1.1.0)butane
2-n-butyl-1-cyano-3(9-heptadecyl)-2-methyl- bicyclo(1.1.0)butane
1-cyano-4-cyclohexyl-2-cyclopropyl-2,3-dimethyl- bicyclo(1.1.0)butane
2-benzyl-1-cyano-2-methyl-3-tetradecylbicyclo (1.1.0)butane
1-cyano-3-methyl-2-(β-naphthyl)bicyclo(1.1.0)butane
1-cyano-2-(α-naphthyl)-2-phenyl-3-(1-phenyl-1-p-tolyl)- methylbicyclo(1.1.0)butane
1-cyano-3-(β-cyclohexylethyl)bicyclo(1.1.0)butane
1-cyano-2-cyclohexylmethyl-3-methylbicyclo (1.1.0)butane
1-phenylbicyclo(1.1.0)butane
1-p-hydroxyphenylbicyclo(1.1.0)butane
1-p-chlorophenylbicyclo(1.1.0)butane
1-ethylthiocarbonylbicyclo(1.1.0)butane
1-chlorobicyclo(1.1.0)butane
3-chloro-1-methoxycarbonylbicyclo(1.1.0)butane
1-methoxybicyclo(1.1.0)butane
1-acetoxybicyclo(1.1.0)butane
1-nitrobicyclo(1.1.0)butane
1-p-tolylsulfonylbicyclo(1.1.0)butane
1-N-ethylcarbamoylbicyclo(1.1.0)butane
1-N,N-dimethylcarbamoylbicyclo(1.1.0)butane
1-formylbicyclo(1.1.0)butane
1-(β-hydroxyethyl)bicyclo(1.1.0)butane
1-(β-chloroethyl)bicyclo(1.1.0)butane
2,4-dicyanobicyclo(1.1.0)butane
1,2,3,4-tetracyanobicyclo(1.1.0)butane
2,4-dichlorobicyclo(1.1.0)butane
2,4-bis(methylsulfonyl)bicyclo(1.1.0)butane
2,4-dinitrobicyclo(1.1.0)butane
2,4-diacetylbicyclo(1.1.0)butane
2,4-bis(diethylamino)bicyclo(1.1.0)butane
2,4-bis(n-butoxy)bicyclo(1.1.0)butane
2,4-bis(hydroxy)bicyclo(1.1.0)butane
2,4-dibromobicyclo(1.1.0)butane
2,4-diiodobicyclo(1.1.0)butane
1-acetylbicyclo(1.1.0)butane
sodium bicyclo(1.1.0)butane-1-carboxylate When the 1-substituted cyclobutenes shown in Table IV below are substituted for 1-cyanocyclobutene in the procedures of Examples 9 and 34 above, the corresponding acrylonitrile and methyl methacrylate copolymers are obtained.

TABLE IV

N-butyl-3-methyl-1-cyclobutene-1-carboxamide
3-isopropylcyclobutene-1-carboxylic acid
3-ethyl-3-methylcyclobutene-1-carbonitrile
3-phenylcyclobutene-1-carboxylic acid
3,4,4-trimethylcyclobutene-1-carbonitrile 3-isopropylcyclobutene-1-carboxylic acid and 3-phenylcyclobutene-1-carboxylic acid are prepared, respectively, from 3-isopropylcyclobutanecarboxylic acid and 3-phenylcyclobutanecarboxylic acid by treating the cyclobutane acids with $SOCl_2$ and bromine in $PBr_3$ to obtain the corresponding 1-bromo-1-carbonyl chlorides. These are treated with methanol to obtain the corresponding esters, which on treatment with KOH yield the indicated cyclobutene carboxylic acids.

EXAMPLE 52

A clean, nitrogen-swept glass pressure tube was charged with 1.0 g. of 1-acetoxycyclobutene, 1.0 g. of acrylonitrile, 4 ml. of oxygen-free distilled water, 0.4 ml. of soap solution (1 g. of sodium lauryl sulfate in 10 ml. of oxygen-free distilled water), and 0.010 g. of azobisisobutyronitrile. The tube was capped and rotated in a 70° C. bath overnight, then opened and the contents blended twice with methanol. The precipitate was collected and dried in a vacuum oven to give 0.9 g. (45% conversion) of copolymer incorporating 42.4% of 1-acetoxycyclobutene, inherent viscosity 0.94 at 0.5% concentration in dimethylformamide at 25° C.

EXAMPLE 53

A clean, nitrogen-swept glass pressure tube was charged with 1 g. of 1-acetoxycyclobutene, 1 g. of 1-cyanocyclobutene, 4 ml. of oxygen-free distilled water, 0.4 ml. of soap solution, and 0.010 g. of azobisisobutyronitrile. The tube was capped and rotated in a 70° C. bath overnight, then opened and the contents blended twice with methanol. The precipitate was collected and dried in a vacuum oven to give 0.6 g. (30% conversion) of copolymer incorporating 40.1% of 1-acetoxycyclobutene, inherent viscosity 0.84 at 0.5% concentration in dimethylformamide at 25° C.

EXAMPLE 54

A clean, nitrogen-swept glass pressure tube was charged with 1 g. of 1-acetoxycyclobutene, 1.0 g. of 1-cyanocyclobutene, 7 ml. of oxygen-free distilled water, 1.25 ml. of potassium persulfate solution (1 g. in 125 ml. of oxygen-free distilled water), and 0.2 ml. of soap solution. The tube was capped and rotated in a 70° C. bath overnight, then opened and the contents blended twice with methanol. The precipitate was collected and dried in a vacuum oven to give 1.2 g. (60% conversion) of copolymer incorporating 30.4% of 1-acetoxycyclobutene, inherent viscosity 1.20 at 0.5% concentration in dimethylformamide at 25° C.

EXAMPLE 55

A clean, nitrogen-swept glass pressure tube was charged with 1 g. of 1-phenylcyclobutene, 1 g. of acrylonitrile, 4 ml. of oxygen-free distilled water, 0.4 ml. of soap solution, and 0.010 g. of azobisisobutyronitrile. The tube was capped and rotated in a 70° C. bath for three hours, then opened and the contents blended twice with methanol. The precipitate was collected and dried in a vacuum oven to give 0.4 g. (20% conversion) of copolymer incorporating 66.5% of 1-phenylcyclobutene, inherent viscosity 1.44 at 0.5% concentration in dimethylformamide at 25° C. The copolymer was compression-molded at 200° C. to give a clear, colorless, self-supporting film.

EXAMPLE 56

A clean, nitrogen-swept glass pressure tube was charged with 1 g. of 1-phenylcyclobutene, 1 g. of styrene, 4 ml. of oxygen-free distilled water, 0.4 ml. of soap solution, and 0.010 g. of azobisisobutyronitrile. The tube was rotated in a 70° C. bath for three hours, then opened and the contents blended twice with methanol. The precipitate was collected and dried in a vacuum oven to give 0.7 g. (35% conversion) of copolymer incorporating 1-phenylcyclobutene by infrared analysis, inherent viscosity 0.36 at 0.5% concentration in toluene at 25° C.

EXAMPLE 57

A clean, nitrogen-swept glass pressure tube was charged with 1 g. of 1-phenylcyclobutene, 1 g. of 1-cyanocyclobutene, 4 ml. of oxygen-free distilled water, 0.4 ml. of soap solution, and 0.010 g. of azobisisobutyronitrile. The tube was capped and rotated in a 70° C. bath for three hours, then opened and the contents blended twice with methanol. The precipitate was collected and dried in a vacuum oven to give 0.4 g. (20% conversion) of copolymer incorporating 60% of 1-phenylcyclobutene, inherent viscosity 0.96 at 0.5% concentration in dimethylformamide at 25° C.

EXAMPLE 58

In a 25-ml. three-neck round-bottom flask, fitted with a condenser and mechanical stirrer, flamed out and under nitrogen were charged 15 ml. of sodium-dried tetrahydrofuran and 0.1 ml. of sodium naphthalene solution (prepared from 15 g. of naphthalene and 3.45 g. of sodium, stirred at room temperature for two hours in 50 ml. of dry tetrahydrofuran). The solution was chilled to approximately —75° C. A mixture of 1 g. of 1-phenylcyclobutene and 1 g. of styrene was added all at once. The solution was stirred at —75° C. for 0.5 hour, then blended into excess methanol. The precipitate was collected and re-blended twice with methanol, then collected and dried in a vacuum oven to give 1.7 g. (85% conversion) of copolymer incorporating 1-phenylcyclobutene by infrared analysis, inherent viscosity 0.26 at 0.5% concentration in chloroform at 25° C. The copolymer was compression-molded at 160° C. to give a clear colorless self-supporting film.

EXAMPLE 59

A clean, nitrogen-swept glass pressure tube was charged with 1 g. of 1-phenylcyclobutene, 1 g. of acrylonitrile, 7 ml. of oxygen-free distilled water, 1.25 ml. of potassium persulfate solution (1 g. in 125 ml. of oxygen-free distilled water), 1.2 ml. of sodium metabisulfite solution (2 g. in 100 ml. of oxygen-free distilled water) and 0.2 ml. of soap solution. The tube was capped and rotated in a 50° C. bath overnight, then opened and the contents blended twice with methanol. The precipitate was collected and dried in a vacuum oven to give 0.5 g. (25% conversion) of copolymer incorporating 68% of 1-phenylcyclobutene, inherent viscosity 0.92 at 0.5% concentration in dimethylformamide at 25° C. The copolymer was compression-molded at 200° C. to give a clear, self-supporting film.

EXAMPLE 60

Part A.—1,1-dimethoxy-2-bromocyclobutane

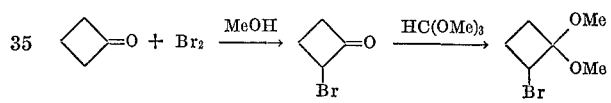

Bromine (30.1 g., 0.19 mole) was added dropwise to a solution of 13.2 g. (0.19 mole) of cyclobutanone and 7 drops of perchloric acid in 100 ml. of methanol. The bromine did not react quickly at first, but near completion care was taken because of the hydrogen bromide which was liberated very quickly. Additional bromine (3.5 g.) was added. Trimethyl orthoformate (30 g., 0.283 mole) was added fairly rapidly, and the temperature of the solution reached about 65° C. The mixture was allowed to cool to 25° C. and solid sodium bicarbonate was added until evolution of carbon dioxide ceased. The mixture was then distilled directly to give 24.6 g. of 1,1-dimethoxy-2-bromocyclobutane (0.126 mole, 66%), B.P. 83° C./25 mm., $n_D^{25}$ 1.4722; ir (neat) 3.38, 3.52, 9–10$\mu$; nmr (neat) $\delta$ 4.2–4.7 (m., 1H, methine), 3.27 (S, 3H, CH$_3$), $\delta$ 3.22 (S, 3H, CH$_3$), 1.5–2.7 (m., 4H, CH$_2$).

Analysis.—Calcd. for C$_6$H$_{11}$O$_2$Br (percent): C, 36.93; H, 5.68; Br, 40.96. Found (percent): C, 37.13, 37.15; H, 5.57, 5.65; Br, 40.96, 41.36.

Part B.—1-methoxycyclobutene

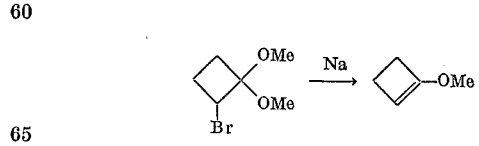

A 1-liter, 4-necked flask was equipped with a mechanical stirrer (glass blade), thermometer, pressure equalized dropping funnel, and a 15-inch spinning band column fitted with a source of nitrogen. To the flask was added 500 ml. of diglyme and 46 g. (2 moles) of sodium. The mixture was heated to 105° C. and 103.5 g. (0.53 mole) of 1,1-dimethoxy-2-bromocyclobutane were added dropwise over 1.5 hours. The pot temperature varied from 105–120° C. and was maintained at 120° C. for 15 minutes after addition was complete. The mixture was cooled, and a Dry Ice trap was attached to the column outlet. The mixture was brought to reflux (closed take-off) at 25 mm. for 1 hour and the volatiles (46.5 g.) were collected in the trap. This was redistilled in base-washed equipment to give 26.8 g. (0.319 mole, 60%) of 1-methoxycyclobutene, B.P. 46° C./250 mm., $n_D^{25}$ 1.4240; ir (neat) 3.28, 3.37, 3.46, 6.08, 7.63, 9.69μ; nmr (neat) δ 4.45 (m., 1H, vinyl), 3.50 (S, 3H, CH$_3$), 2.52 (m., 2H, CH$_2$), 2.0 (m., 2H, CH$_2$). About 9 g. of forerun and heel were obtained (95% pure).

*Analysis.*—Calcd. for C$_5$H$_8$O (percent): C, 71.39; H, 9.59. Found (percent): C, 69.35, 69.36; H, 9.36, 9.43.

Part C

A clean, nitrogen-swept glass pressure tube was charged with 3 g. of 1-methoxycyclobutene, 1 g. of acrylonitrile, 3 ml. of potassium persulfate solution, 2 ml. of soap solution, 0.025 g. of sodium sulfite, and 0.015 g. of sodium bicarbonate. The tube was capped and rotated in a 60° C. bath for 4 hours, then opened and the contents blended twice with methanol. The precipitate was collected and dried in a vacuum oven to give 2.0 g. (50% conversion) of copolymer incorporating 59.2% of 1-methoxycyclobutene, inherent viscosity 0.80 at 0.5% concentration in dimethylformamide at 25° C. The copolymer was compression-molded at 125° C. to give a clear, colorless, self-supporting film.

EXAMPLE 61

A clean, nitrogen-swept glass pressure tube was charged with 3 g. of 1-methoxycyclobutene, 1 g. of 1-cyanocyclobutene, 3 ml. of potassium persulfate solution, 2 ml. of soap solution, 0.025 g. of sodium sulfite, and 0.015 g. of sodium bicarbonate. The tube was capped and rotated in a 60° C. bath overnight, then opened and the contents blended twice with methanol. The precipitate was collected and dried in a vacuum oven to give 0.8 g. (20% conversion) of copolymer incorporating 38.7% of 1-methoxycyclobutene, inherent viscosity 0.33 at 0.5% concentration in dimethylformamide at 25° C.

EXAMPLE 62

In a 50-ml., round-bottom flask with a side arm, flamed out and under nitrogen, was charged 1.0 g. of n-butyl vinyl ether, 1.0 g. of 1-methoxycyclobutene, and 20 ml. of pentane. A quantity of 0.050 ml. of boron trifluoride-diethyl etherate was added at 0° C. After 15 minutes, the reaction mixture was blended twice with methanol. The precipitate was collected and dried in a vacuum oven to give 1.5 g. (75% conversion) of copolymer incorporating 40% of 1-methoxycyclobutene, inherent viscosity 0.2 at 0.5% concentration in toluene at 25° C. The glass transition temperature of this material as indicated by differential thermal analysis was 19° C.

EXAMPLE 63

A clean, nitrogen-swept glass pressure tube was charged with 1 g. of 1-chlorocyclobutene, 1.0 g. of vinyl chloride, 6 ml. of oxygen-free distilled water, 2.8 ml. of potassium persulfate solution, and 0.4 ml. of soap solution. The tube was rotated in a 50° C. bath overnight, then opened and the contents blended twice with methanol. The precipitate was collected and dried in a vacuum oven to give 0.5 g. (25% conversion) of copolymer incorporating 47% of 1-chlorocyclobutene, inherent viscosity 0.30 at 0.1% concentration in tetrahydrofuran at 25° C.

EXAMPLE 64

A clean, nitrogen-swept glass pressure tube was charged with 1 g. of 1-chlorocyclobutene, 1 g. of acrylonitrile, 6 ml. of oxygen-free distilled water, 2.8 ml. of potassium persulfate solution, and 0.4 ml. of soap solution. The tube was capped and rotated in a 50° C. bath overnight, then opened and the contents blended twice with methanol. The precipitate was collected and dried in a vacuum oven to give 1.15 g. (57.5% conversion) of copolymer incorporating 35% of 1-chlorocyclobutene, inherent viscosity 1.91 at 0.5% concentration in dimethylformamide at 25° C.

EXAMPLES 65–86

These copolymerizations are summarized in Table V below. The monomers employed are abbreviated as follows:

CCB = 1-cyanocyclobutene
AN = acrylonitrile
VAc = vinyl acetate
VCl = vinyl chloride
VCl$_2$ = vinylidene chloride
AA = acrylic acid
MA = methyl acrylate
MAA = methacrylic acid
MMA = methyl methacrylate
IB = isobutylene
EA = ethyl acrylate
BA = butyl acrylate
EHA = 2-ethylhexyl acrylate
E = ethylene
BD = butadiene The following polymerization methods were used as indicated:

Method A.—Azobisisobutyronitrile emulsion (1) 10 g. of monomer or monomer mixture
(2) 20 ml. of distilled degassed water
(3) 2 ml. of soap solution (1 g. of sodium lauryl sulfate in 10 ml. of water)
(4) 50 mg. of azobisisobutyronitrile Method B.—Solution (1) 10–20 g. of monomer or monomer mixture
(2) 100 ml. of solvent (dimethyl sulfoxide or α-butyrolactone)
(3) 100 mg. of azobisisobutyronitrile Method C.—Persulfate emulsion (1) 10 g. of monomers
(2) 15 ml. of water
(3) 10 ml. of potassium persulfate solution
(4) 1.2 ml. of soap solution Method D.—Buffered persulfate emulsion (1) 4 g. of monomer mixture
(2) 3 ml. of potassium persulfate solution
(3) 2 ml. of soap solution
(4) 25 mg. of sodium sulfite
(5) 15 mg. of sodium bicarbonate For all polymerization methods, the ingredients were placed in a glass pressure vessel, sealed under nitrogen and rotated at 50–70° C. for 2–16 hours. The polymers were isolated by blending at least twice with methanol followed by drying in a vacuum oven. Emulsions were broken by freezing before blending or by blending with methanol containing a small amount of saturated aqueous sodium chloride solution. The dried polymers were analyzed by (1) elemental analysis to determine composition, (2) differential thermal analysis (DTA) to determine the glass transition temperature (T$_g$) and melting point, and (3) thermal gravimetric analysis (TGA) to determine decomposition by measuring weight loss. Inherent viscosities were determined on 0.5% solutions at 25° C. using an Ubbelohde viscometer. The solvent was dimethylformamide (DMF) except where indicated as chloroform or hexamethylphosphoramide (HMPA). Polymer films were prepared by compression-molding between foils in a platen press. Microtensile bars were prepared by compression-molding and examined as indicated in the table.

TABLE V.—EXAMPLES 65 TO 86

| Ex. | Monomers | Monomer feed ratio (weight) | Polymerization method | Yield, grams | Polymer composition, weight, percent | Inherent viscosity (DMF) | TGA weight loss, (°C) 5% | TGA weight loss, (°C) 50% | DTA Tg, °C. T | Molding °C. | Appearance | Tensile (p.s.i.) | Elongation (percent) | Modulus (p.s.i.) |
|---|---|---|---|---|---|---|---|---|---|---|---|---|---|---|
| 65 | CCB/MA | 50/50 | A | 9.2 (92%) | 48.7/51.3 | 2.14 | 350 | 400 | 140 | 210 | Light yellow, clear | 3,830 / 3,680 | 1.2 / 1.2 | 339,210 / 350,710 |
| 66 | AN/CCB/IB | 40/40/20 | A | 6.9 (69%) | 48.2/33.5/18.3 | 0.95 | 359 | 445 | 140 | 160 | Clear, pale yellow | 2,000 / 3,060 | 0.58 / 0.58 | 466,000 / 501,000 |
| 67 | CCB/AN/MA | 40/40/20 | A | 9.0 (90%) | 18.4 MA | 4.43 | 340 | 560 |  | 170 | do | 3,210 / 1,830 | 0.39 / 0.28 | 569,000 / 770,000 |
| 68 | AN/CCB/EA | 45/45/10 | A | 6.8 (85%) | 9.5 EA | 2.61 | 335 | 620 | 140 | 185 | Clear, yellow | 3,790 / 3,310 | 0.64 / 0.69 | 532,000 / 549,000 |
| 69 | AN/CCB/BA | 40/40/20 | A | 7.8 (78%) | 17.8 EA | 2.38 | 330 | 500 | 125 | 170 | Clear, pale yellow, hazy areas | 2,850 / 2,100 | 0.65 / 0.41 | 443,000 / 479,000 |
| 70 | AN/CCB/EHA | 35/35/30 | A | 6.7 (83%) | 30.1 EHA | 2.20 | 350 | 440 | 102 | 170 | Light yellow, cloudy | 3,520 / 3,400 | 1.12 / 1.04 | 339,000 / 357,000 |
| 71 | AN/CCB/VAc | 45/45/10 | A | 5.8 (72.5%) | 8.1 Vac | 2.52 | 326 | 627 |  | 170 | Light yellow, nearly clear | 2,660 / 3,080 | 0.45 / 0.58 | 626,000 / 542,000 |
| 72 | CCB/VCl | 75/25 | B | 6.8 (68%) | 14.0 VCl | 0.41 | 230 | 445 |  | 210 | Brown, opaque, strong odor |  | (¹) |  |
| 73 | CCB/BD | 54/46 | A | 6.35 (85.9%) | 55.2 CCB | (²) | 354 | 445 | 27-28 | 100 | Yellow, translucent | 1,230 / 1,420 | 248.8 / 0.54 | 97,900 / 105,400 |
| 74 | CCB/E | 75/25 | B | 5.1 (63.7%) | 91.9 CCB | 0.62 | 330 | 417 |  | 250 | Brown, opaque, fused | 1,860 / 1,710 / 2,030 | 0.43 / 0.70 | 377,500 / 393,200 / 387,000 |
| 75 | [COOMe/MMA] | 50/50 | A | 5.0 (83.4%) | 54.1 | 2.10 (CHCl₃) | 305 | 331 | 133-135 | 200 | Clear, colorless, brittle | 785 | 0.22 | 400,500 |
| 76 | [COOMe/MA] | 50/50 | A | 5.3 (88.5%) | 53.0 | 1.62 (CHCl₃) | 365 | 396 |  | 150 | Clear, colorless | 3,110 | 1.23 | 266,400 |
| 77 | [COOMe/AN] | 50/50 | A | 4.7 (78.3%) | 47.6 AN | 1.73 | 319 | 452 | 123 | 150 | Pale yellow, slightly hazy | 2,440 / 2,340 | 0.58 / 0.54 | 432,000 / 400,400 |
| 78 | [COOMe/CCB] | 50/50 | A | 4.6 (76.7%) | 46.3 CCB | 2.11 | 338 | 488 | 157-167 | 250 | Hazy, light brown, fused | 3,620 / 2,860 | 1.48 / 1.02 | 274,700 / 271,600 |
| 79 | CCB/BD | 80/20 | (³) | 5.1 (63.7%) | 70.3 CCB | (¹) | 335 | 488 |  | 150 | Yellow, clear, slightly hazy | 3,170 / 3,470 | 0.8 / 1.0 | 406,200 / 363,500 |
| 80 | AN/CCB/VCl | 40/40/20 | A | 5.2 (65.0%) | 9.0 VCl | 2.46 | 273 | 773 | 160-165 | 185-190 | Yellow and white specks, nearly transparent | 3,490 / 4,020 | 0.63 / 0.82 | 605,000 / 509,000 |
| 81 | AN/CCB/VCl₂ | 30/30/40 | A | 5.7 (71.3%) | 38.4 VCl₂ | 1.34 | 214 | 530 |  | 150 | Light yellow-amber, nearly transparent | 3,540 / 2,650 | 0.61 / 0.45 | 610,000 / 613,600 |
| 82/83 | CCB/n-BuOCH=CH₂ / CCB/VCl₂ | 25/75 / 35/65 | D / A | 0.3 (7.5%) / 8.1 (81%) | 63.2/36.8 / 37.9/62.1 | 0.40 / 1.04 (HMPA) | 363 / 217 | 411 / 405 | -138 / -133 | 135 | Translucent, light amber | 2,490 / 2,620 | 0.43 / 0.51 | 612,000 / 545,000 |
| 84 | AN/CCB/VCl₂ | 30/10/60 | C | 8.65 (86.5%) | 57.8 VCl₂ | 2.32 (HMPA) |  |  | -97 | 160 | Dark yellow, clear | 8,500 / 7,080 | 2.08 / 1.70 | 614,000 / 639,000 |
| 85 | AN/CCB/MMA | 15/10/75 | C | 8.6 (86%) |  | 2.34 | 358 | 392 | 113 | 200 | Very light yellow, clear | 6,780 / 11,710 | 1.78 / 3.05 | 472,000 / 442,000 |
| 86 | AN/CCB/MA | 45/5/50 | C | 8.1 (81%) |  | 2.84 | 355 | 431 | 72 | 175 | Clear, yellow | 11,670 | 2.45 | 630,630 / 630,630 |

¹ Insoluble; ² No break; ³ A with isobutyraldehyde.

EXAMPLE 87

A "soap solution" was prepared by dissolving 2.25 g. of Ivory soap and 0.300 g. of stearic acid in 25 ml. of deaerated water. A "salt solution" was prepared by dissolving 0.080 g. of sodium pyrophosphate decahydrate, 0.150 g. of potassium chloride, and 0.010 g. of ferric sulfate in 3.0 ml. of deaerated water. The above two solutions were added to a 500-ml. round-bottom flask equipped with mechanical stirrer, thermometer, and reflux condenser protected by a nitrogen blanket, and containing 62 ml. of deaerated water. The following ingredients were then added in order:

10.0 g. of isoprene (distilled)
40.0 g. of 1-cyanocyclobutene
0.10 g. of tertiary dodecylmercaptan
0.60 g. of 30% hydrogen peroxide.

On vigorous agitation at 30° C. the system formed a white emulsion. It was stirred at 29–30° C. for 4.5 hours at which time another 0.60 g.-portion of 30% hydrogen peroxide catalyst was added. Polymerization was continued for an additional 66 hours at 26–30° C. after which the polymer was isolated as follows. Excess monomers were stripped out by heating at 65° C. at 200 mm. pressure. The residual latex was treated successively with:

0.30 g. of phenyl-$\beta$-naphthylamine
0.40 g. of sodium salts of sulfate monoesters of mixed higher fatty alcohols
40 g. of saturated aqueous sodium chloride.

The curdy polymer which separated was collected and dried in a vacuum oven at 50° C. overnight. The hard, white granules of polymer weighed 16.6 g. It was heated at 100° C. with 300 ml. of dimethylformamide and centrifuged. The supernatant solution was decanted from about 20 ml. of gel sludge and diluted in 1500 ml. of methanol. The polymer which precipitated was dried at 60° C. in a vacuum desiccator. A pale brown, tough, fibrous plastic weighing 10.5 g. was obtained. The nitrogen analysis indicated a 1-cyanocyclobutene content of 69 weight percent. The inherent viscosity measured at 0.5 weight percent in dimethylformamide at 25° C. was 1.14. A clear, brown-tinted film was obtained by pressing at 200° C.

EXAMPLES 88–95

In each of these examples, the following procedure was followed: A mixture of 600 ml. of water and 2.0 g. of sodium lauryl sulfate was placed in a 2-liter glass flask fitted with dropping funnel, stirrer and reflux condenser. The temperature was brought to 34° C. and 1.2 g. of ammonium persulfate, 1.2 g. of sodium metabisulfite and 0.003 g. of ferrous ammonium sulfate hexahydrate was added. A 400 g. mixture of monomers having the composition (by weight) indicated in Table VI was placed in the dropping funnel and added with stirring over a period of 70 minutes. The monomer abbreviations are the same as those shown for Examples 65–86. During the addition, the heat of polymerization caused refluxing to occur. At the end of the addition, refluxing ceased and there was obtained a white aqueous dispersion of copolymer having the average particle size and surface tension indicated. Portions of each of these dispersions were coated onto oriented polypropylene films and dried. The dried copolymer coatings were clear and all provided a protective oxygen barrier coating to the polypropylene substrate.

TABLE VI

| Example | Composition (by weight) | Particle size ($\mu$m) | Surface tension (dynes/cm.) |
|---|---|---|---|
| 88 | 90/5/5 VCl$_2$/CCB/AA | 0.054 | 55.1 |
| 89 | 92/3/5 VCl$_2$/CCB/AA | 0.054 | -- |
| 90 | 92/5/3 VCl$_2$/CCB/AA | 0.060 | 54.4 |
| 91 | 91.5/3.5/5 VCl$_2$/CCB/AA | 0.070 | 56.1 |
| 92 | 90/7/3 VCl$_2$/CCB/AA | 0.056 | 60.5 |
| 93 | 88/7/5 VCl$_2$/CCB/AA | 0.048 | 57.3 |
| 94 | 88/3.5/3.5/5 VCl$_2$/CCB/AN/AA | 0.055 | 53.2 |
| 95 | 90/5/5 VCl$_2$/CCB/MAA | 0.063 | 63.2 |

When triethyl orthoformate is substituted for trimethyl orthoformate in the procedure of Example 60, Part A, 1-ethoxycyclobutene is obtained in Part B and the film-forming 1- ethoxycyclobutene/acrylonitrile copolymer is obtained in Part C.

UTILITY

The new alkoxycyanocyclobutenes are primarily useful as copolymer components; the alkoxy group destroys the symmetry of the cyclobutene moiety in a polymer chain and tends to lower the softening point and increase the elastic properties. These alkoxycyanocyclobutenes are analogous to 1-cyanobicyclobutane and 1-cyanocyclobutene in being useful for improving properties of acrylonitrile fibers.

Both the homopolymers and copolymers of this case are useful in the formation of fibers, molded objects and self-supporting films. In addition to the utility disclosures in the preceding numbered examples, the following Example A (compare Example 20) shows specifically the preparation of a film from a 1-cyanocyclobutene/ethylacrylate copolymer and the use of the same on steel panels:

EXAMPLE A (A) Preparation of 1-cyanocyclobutene/ethyl acrylate (45/55) copolymer A 12-oz. glass pressure bottle was charged with:

|  | G. |
|---|---|
| 1-cyanocyclobutene | 9.0 |
| Ethyl acrylate | 11.0 |
| Acetone (Reagent grade) | 20.0 |
| Azodiisobutyronitrile | 0.040 |

The bottle was purged with nitrogen, capped and tumbled in a water bath at 60° C. for 22 hours. The bath temperature was then raised to 75° C. during about 1 hour and maintained at 75° C. for an additional hour. The resulting clear, yellow, viscous polymer solution was diluted with 200 ml. of acetone and precipitated into deionized water in a 1 gallon size laboratory blender. The finely divided precipitate of polymer was filtered off, washed thoroughly with deionized water and dried to constant weight in air. This gave 16.3 g. (81.5% yield) of an off-white, very fluffy, fibrous solid, which is completely soluble in cyclohexanone and methyl ethyl ketone. The polymer has an inherent viscosity (0.5% solution in methyl ethyl ketone) of 0.50 and a nitrogen content of 7.91%, indicating that it contains 44.7% 1-cyanocyclobutene.

(B) Preparation and application of films

Free self-supporting films of the copolymer from A were prepared by casting from a 30% solution in 1/1 by weight methyl ethyl ketone/cyclohexanone on glass panels with a 0.020 inch doctor blade, air drying for 30 minutes, baking 60 minutes at 300° F. and soaking the films off the glass by immersion in water. The films were clear, fairly tough and flexible and had a tensile strength of 5900 p.s.i. and an ultimate elongation of 6.7%, as measured at 77° F./50% R.H. at a 20% per minute rate of elongation. Films of the copolymer applied to steel panels primed with a standard automotive body primer and baked as above have a high gloss (20° gloss of 82), good hardness (Tukon hardness of 9 Knoop Hardness Units) and outstanding resistance to crazing by lacquer solvents (no crazing down to at least 10° C.) and to distortion by salt residues from dried water droplets (no distortion up to at least 88° C.). These properties commend this copolymer as a film former for an automotive lacquer resistant to mechanical damage such as chipping, cracking, crazing and film distortion.

The embodiments of the invention in which an exclusive property or privilege is claimed are defined as follows:

1. A copolymer comprised of from 1–99 mole percent of a cyclobutene comonomer of the formula

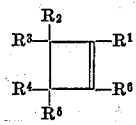

wherein $R^1$ is hydrogen or hydrocarbyloxy of up to 8 carbon atoms;
$R^2$–$R^5$ are hydrogen, hydrocarbyl of up to 16 carbon atoms, chloro, bromo or 3-cyanocyclobutyl; and
$R^6$ is acetoxy, phenyl, lower alkoxy, chloro, cyano or its common analogs carboxyl, alkoxycarbonyl, carbamoyl or N-alkylcarbamoyl; and from 99–1 mole percent of at least one unsaturated or strained ring compound or a mixture of an unsaturated and strained ring compound selected from the group consisting of

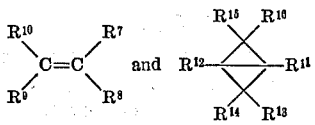

wherein $R^7$ is hydrogen, halogen, hydrocarbyl, lower alkoxy, cyano, carboxyl, lower carbacyl or lower alkoxycarbonyl;
$R^8$ is hydrogen, halogen, lower alkyl, phenyl, vinyl, halovinyl, loweralkylvinyl, cyano, methylpyridinyl or phenylene sodium sulfonate;
$R^9$ is hydrogen, halogen or lower alkoxycarbonyl;
$R^8$ and $R^9$ taken together are alkylene of 2–4 carbon atoms;
$R^{10}$ is hydrogen or halogen;
$R^{11}$ and $R^{12}$ are each selected from hydrogen, halogen, hydroxyloweralkyl, hydroxyphenyl, haloloweralkyl, halophenyl, —COOH, —COOR, —COSR, —COOM, —CONH$_2$, —CONHR, —CONR$_2$, —SO$_2$R, —CHO, —COR, —OCOR, —OR, —NO$_2$, —CN, or —R, wherein M is one equivalent of a metal cation and R is hydrocarbyl of up to 18 carbon atoms free of ethylenic and acetylenic carbon-to-carbon unsaturation; and
$R^{13}$, $R^{14}$, $R^{15}$ and $R^{16}$ are each selected from hydroxy, amino, —NR$_2$, or $R^{11}$.

2. The copolymers of claim 1 wherein the unsaturated comonomer is of the formula

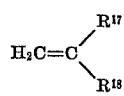

wherein $R^{17}$ is selected from the group consisting of hydrogen, cyano, alkoxycarbonyl, acyl, acyloxy having 2–19 carbon atoms, alkoxy having 1–18 carbon atoms, phenylene sodium sulfonate, phenyl, chlorine, bromine and fluorine; and
$R^{18}$ is selected from hydrogen, halogen, lower alkyl, phenyl, vinyl, halovinyl, loweralkylvinyl, cyano or methylpyridinyl.

3. The copolymers of claim 1 wherein the comonomeric units are 1-cyanocyclobutene and 1-cyanobicyclo-(1.1.0)butane.

4. The copolymers of claim 1 wherein the comonomeric units are 1-cyanocyclobutene, 1-cyanobicyclo(1.1.0) butane and acrylonitrile.

5. The copolymers of claim 1 wherein the monomeric units are 1-cyanocyclobutene and ethyl acrylate.

6. The copolymers of claim 2 wherein the comonomeric units are 1-cyanocyclobutene and acrylonitrile.

7. The copolymers of claim 2 wherein the comonomeric units are 3-methyl-1-cyanocyclobutene and acrylonitrile.

8. The copolymers of claim 2 wherein the comonomeric units are 3-methyl-1-cyanocyclobutene and ethyl acrylate.

9. The copolymers of claim 2 wherein the comonomeric units are 3-methyl-1-cyanocyclobutene and styrene.

10. The copolymers of claim 2 wherein the comonomeric units are 3-ethyl-1-cyanocyclobutene and acrylonitrile.

11. The copolymers of claim 2 wherein the comonomeric units are 3-pentyl-1-cyanocyclobutene and acrylonitrile.

12. The copolymers of claim 2 wherein the comonomeric units are 3-bromo-1-cyanocyclobutene and acrylonitrile.

13. The copolymers of claim 2 wherein the comonomeric units are 3-(3-cyanocyclobutyl) - 1 - cyanocyclobutene and acrylonitrile.

14. The copolymers of claim 2 wherein the comonomeric units are 3,3-dimethyl - 1 - cyanocyclobutene and acrylonitrile.

15. The copolymers of claim 2 wherein the comonomeric units are 3-bromo-3-methyl - 1 - cyanocyclobutene and acrylonitrile.

16. The copolymers of claim 2 wherein the comonomeric units are methyl 3,3 - dimethylcyclobutene-1-carboxylate and acrylonitrile.

17. The copolymers of claim 2 wherein the comonomeric units are 1-cyanocyclobutene and methyl methacrylate.

18. The copolymers of claim 2 wherein the comonomeric units are 1-carbomethoxycyclobutene and methyl methacrylate.

19. The copolymers of claim 2 wherein the comonomeric units are 3,3-dimethyl - 1 - cyclobutenecarboxamide and methyl methacrylate.

20. A copolymer comprised of from 1–99 mole percent of an alkoxycyclobutene comonomer of the formula

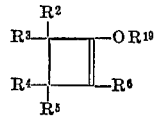

wherein $R^2$–$R^5$ are hydrogen, hydrocarbyl of up to 16 carbon atoms, chloro, bromo or 3-cyanocyclobutyl;
$R^6$ is acetoxy, phenyl, lower alkoxy, chloro, cyano or its common analogs carboxyl, alkoxycarbonyl, carbamoyl or N-alkylcarbamoyl; and
$R^{19}$ is a hydrocarbyl group of up to 8 carbon atoms; and from 99–1 mole percent of at least one unsaturated or strained ring compound selected from the group consisting of

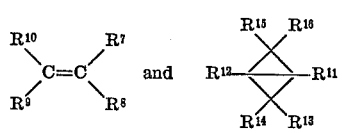

wherein $R^7$ is hydrogen, halogen, hydrocarbyl, lower alkoxy, cyano, carboxyl, lower carbacyl or lower alkoxycarbonyl;

$R^8$ is hydrogen, halogen, lower alkyl, phenyl, vinyl, halovinyl, loweralkylvinyl, cyano, methylpyridinyl or phenylene sodium sulfonate;

$R^9$ is hydrogen, halogen or lower alkoxycarbonyl;

$R^8$ and $R^9$ taken together are alkylene of 2–4 carbon atoms;

$R^{10}$ is hydrogen or halogen;

$R^{11}$ and $R^{12}$ are each selected from hydrogen, halogen, hydroxyloweralkyl, hydroxyphenyl, haloloweralkyl, halophenyl, —COOH, —COOR, —COSR, —COOM, —CONH$_2$, —CONHR, —CONR$_2$, —SO$_2$R, —CHO, —COR, —OCOR, —OR, —NO$_2$, —CN, or —R, wherein M is one equivalent of a metal cation and R is hydrocarbyl of up to 18 carbon atoms free of ethylenic and acetylenic carbon-to-carbon unsaturation; and $R^{13}$, $R^{14}$, $R^{15}$ and $R^{16}$ are each selected from hydroxy, amino, —NR$_2$, or $R^{11}$.

21. The copolymers of claim 20 wherein the comonomeric units are 2-methoxy - 1 - cyanocyclobutene and acrylonitrile.

22. A homopolymer wherein the recurring structural unit is

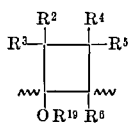

wherein $R^2$–$R^5$ are hydrogen, hydrocarbyl of up to 16 carbon atoms, chloro, bromo or 3-cyanocyclobutyl;

$R^6$ is acetoxy, phenyl, lower alkoxy, chloro, cyano or its common analogs carboxyl, alkoxycarbonyl, carbamoyl or N-alkylcarbamoyl; and $R^{19}$ is hydrocarbyl of up to 8 carbon atoms.

23. The homopolymer of 2 - methoxy-1-cyanocyclobutene.

24. The self-supporting films formed from the copolymers of claim 1.

25. The self-supporting films formed from the copolymers of claim 2.

26. The self-supporting films formed from the copolymers of claim 20.

27. The self-supporting films formed from the homopolymers of claim 22.

28. The fibers formed from the copolymers of claim 1.

29. The fibers formed from the copolymers of claim 2.

30. The fibers formed from the copolymers of claim 20.

31. The fibers formed from the homopolymers of claim 22.

References Cited

UNITED STATES PATENTS

| | | | |
|---|---|---|---|
| 2,961,429 | 11/1960 | Anderson | 260—63 |
| 2,995,543 | 8/1961 | Williams | 260—82.1 |
| 3,361,722 | 1/1968 | Prem et al. | 260—88.1 |
| 3,457,194 | 7/1969 | Hall | 260—78.5 |

OTHER REFERENCES

Brannock et al.: Cycloaddition Reactions of Enamines Derived from Aldehydes and Cyclic Ketones, Enamine Chemistry IV, pp. 801–812, vol. 29, April 1964.

JAMES A. SEIDLECK, Primary Examiner

J. KIGHT III, Assistant Examiner

U.S. Cl. X.R.

260—88.1 PN, 88.3 R, 88.7 A, 89.1, 89.7 R, 91.1 R, 93.1, 464, 80.76, 82.1, 85.5 R, 85.5 A, 85.7, 86.1 R, 86.1 N, 86.3, 86.7, 88.1 R; 117—161; 260—47 U, 63 N, 78 UA, 78.5 R, 78.5 E, 79.3 M, 80 P, 80.73, 80.75